(12) United States Patent
Domash et al.

(10) Patent No.: US 7,003,181 B2
(45) Date of Patent: Feb. 21, 2006

(54) SWITCHABLE OPTICAL COMPONENTS

(76) Inventors: Lawrence H. Domash, 61 Hickory Ridge Rd., Conway, MA (US) 01341; Brent Little, 59 St. Germain St., Boston, MA (US) 02115

( * ) Notice: Subject to any disclaimer, the term of this patent is extended or adjusted under 35 U.S.C. 154(b) by 0 days.

(21) Appl. No.: 10/885,163

(22) Filed: Jul. 6, 2004

(65) Prior Publication Data

US 2005/0047705 A1    Mar. 3, 2005

Related U.S. Application Data

(60) Division of application No. 10/107,593, filed on Mar. 26, 2002, now Pat. No. 6,771,857, which is a continuation-in-part of application No. 08/797,950, filed on Feb. 12, 1997, now Pat. No. 5,937,115.

(60) Provisional application No. 60/055,571, filed on Aug. 13, 1997.

(51) Int. Cl.
*G02F 1/295* (2006.01)
(52) U.S. Cl. .................................. 385/10; 385/4; 385/8
(58) Field of Classification Search ..................... 385/8, 385/10, 16, 37, 40
See application file for complete search history.

(56) References Cited

U.S. PATENT DOCUMENTS

| | | | |
|---|---|---|---|
| 4,003,629 A | 1/1977 | Baues et al. | |
| 4,006,963 A | 2/1977 | Baues et al. | |
| 4,688,900 A | 8/1987 | Doane et al. | |
| 4,721,352 A | 1/1988 | Sorin et al. | |
| 4,938,568 A | 7/1990 | Margerum et al. | |
| 5,096,282 A | 3/1992 | Margerum et al. | |
| 5,182,665 A | 1/1993 | O'Callaghan et al. | |
| 5,488,681 A | 1/1996 | Deacon et al. | |
| 5,544,268 A | 8/1996 | Bischel et al. | |
| 5,581,642 A | 12/1996 | Deacon et al. | |
| 5,757,536 A | 5/1998 | Ricco et al. | |
| 5,937,115 A | 8/1999 | Domash | |
| 5,942,157 A | 8/1999 | Sutherland et al. | |
| 6,078,704 A | 6/2000 | Bischel et al. | |
| 6,614,948 B1 * | 9/2003 | Jacobowitz et al. | .......... 385/10 |
| 2002/0191912 A1 | 12/2002 | Robinson et al. | |

OTHER PUBLICATIONS

Sutherland, R. L. et al, "Electrically switchable volume gratings in polymer-dispersed liquid crystals." Appl. Phys. Lett., 64(9):1074-1076, Feb. 28, 1994.
Sutherland, R. L.et al "Development of photopolymer-liquid crystal etc." SPIE: Diffractive and Holographic Optics Technology, 2152: 303-313, Jan. 1994.
Syms, R. et al., Optical Guided Waves and Devices. McGraw-Hill: Lodon, p. 274-277, Jul. 1992.

(Continued)

*Primary Examiner*—Jennifer Doan
(74) *Attorney, Agent, or Firm*—Jerry R. Potts

(57) ABSTRACT

This invention relates to a number of components, devices and networks involving integrated optics and/or half coupler technology, all of which involve the use of electronically switchable Bragg grating devices and device geometries realized using holographic polymer/dispersed liquid crystal materials. Most of the components and devices are particularly adapted for use in wavelength division multiplexing (WDM) systems and in particular for use in switchable add/drop filtering (SADF) and wavelength selective crossconnect. Attenuators, outcouplers and a variety of other devices are also provided.

7 Claims, 32 Drawing Sheets

48

OTHER PUBLICATIONS

Whalen, W. S. et al, "Demonstration of a narrowband Bragg-reflection filter in a single-mode fiber directional coupler," Electron. Lett., vol. 22, pp. 681-682, 1986.

Sutherland, R.L., et al, "Switchable holograms in a new photopolymer-liquid crystal composite", SPIE: Diffractive and Holographic Optics Technology, 2404:132-143, Feb. 1995.

Sutherland, R.L. et al, "Bragg Gratings in an Acrylate Polymer Consisting of Periodic Polymer-Dispersed Liquid-Crystal Planes", Chemistry of Materials, 5:10 1533-1538, 1993.

Sutherland, R.L. et al, "Volume holographic image storage and electro-optical readout in a polymer-dispersed liquid-crystal film", Optical Letters, 20:11 1325-1327, Jun. 1995.

Domash, L., et al "Electroically switchable Bragg gratings for large-scale NxN fiber optic cross connects", SPIE vol. 3010, pp. 214-228, Feb. 1997.

Domas, L., et al., "Switchable-focus lenses in holographic polymer dispersed liquid crystal", SPIE vol. 2689, pp. 188-194. Feb. 1996.

Archambault, J.-L., et al., "Grating-Frustrated Coupler: A Novel Channel-Dropping Filter in Single-Mode Optical Fiber", Optics Letters, vol. 19, No. 3, pp. 180-182, Feb. 1994.

Dong, L., et al., "Novel Add/Drop Filters for 20,21 Wavelength-Division-Multiplexing Optical Fiber etc.", IEEE Photonics Tech. Lett., vol. 8, No. 12, pp. 1656-1658, Dec. 1996.

* cited by examiner

ESBG in Guiding Region

ESBG in Evanescent Region

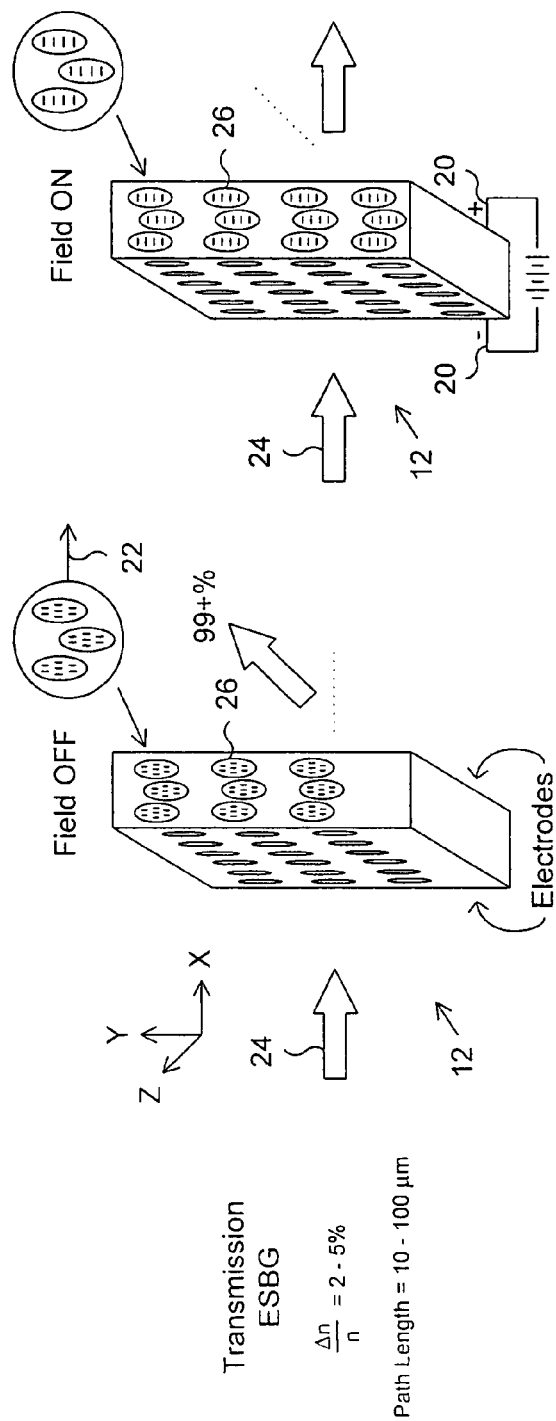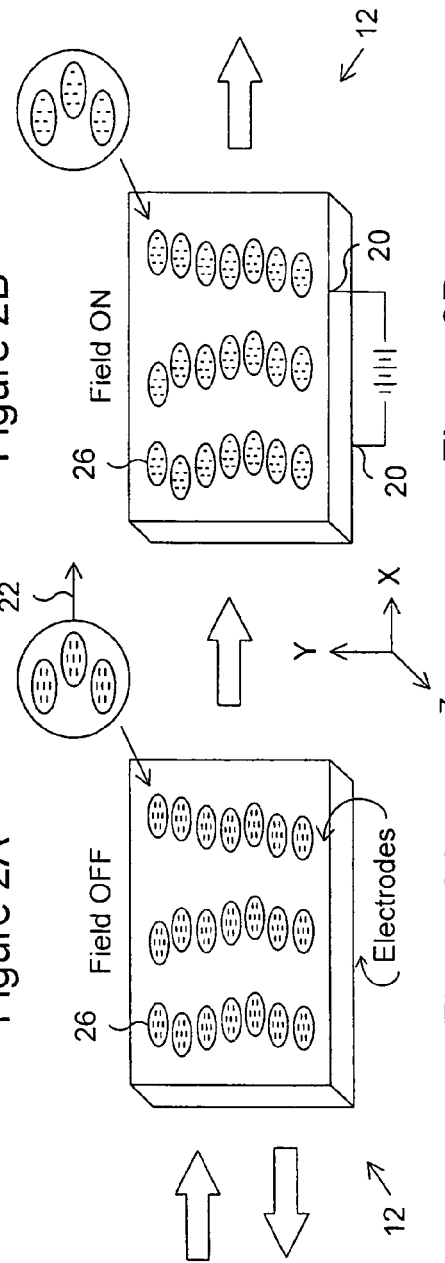

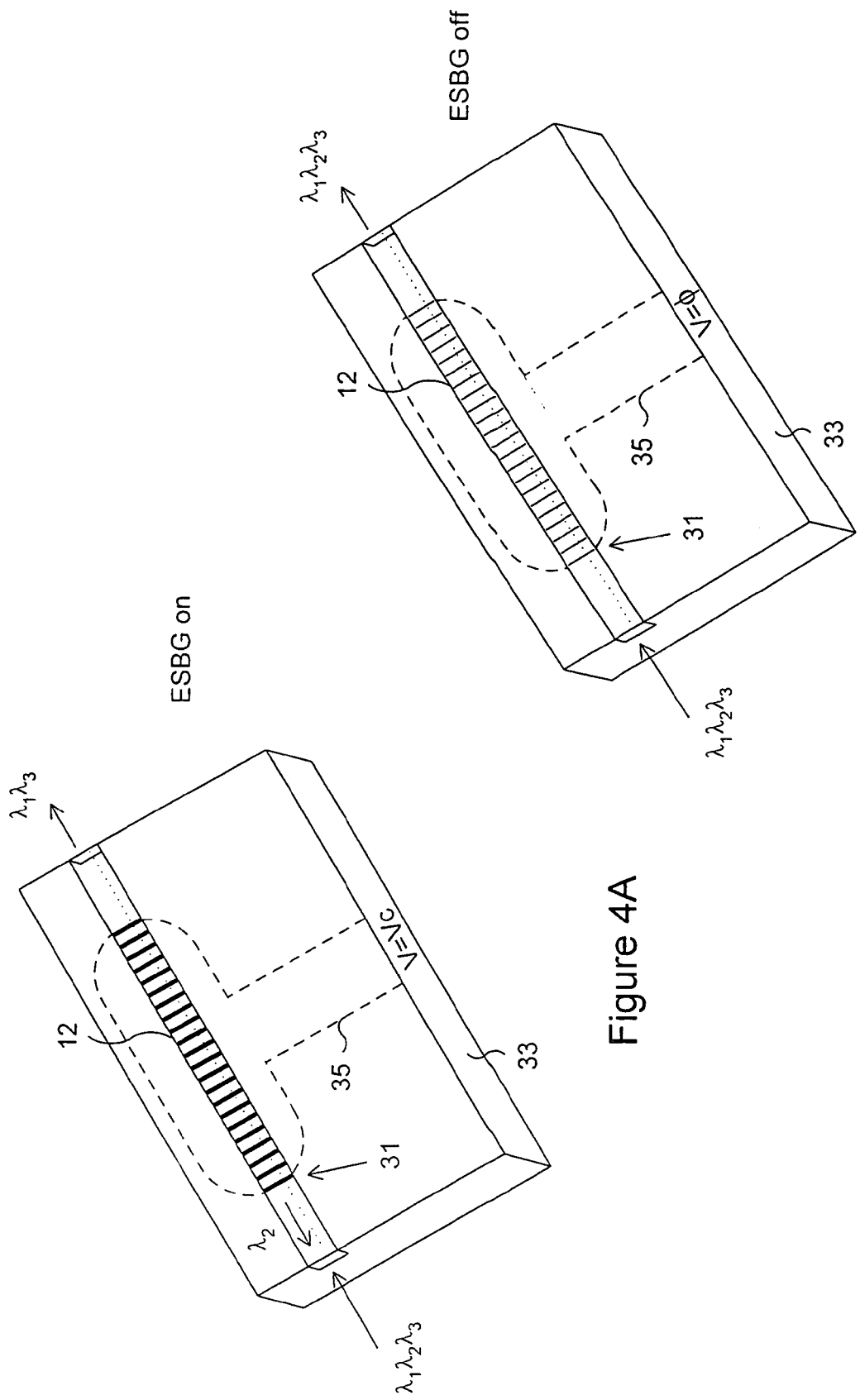

4X4X3 WSXC

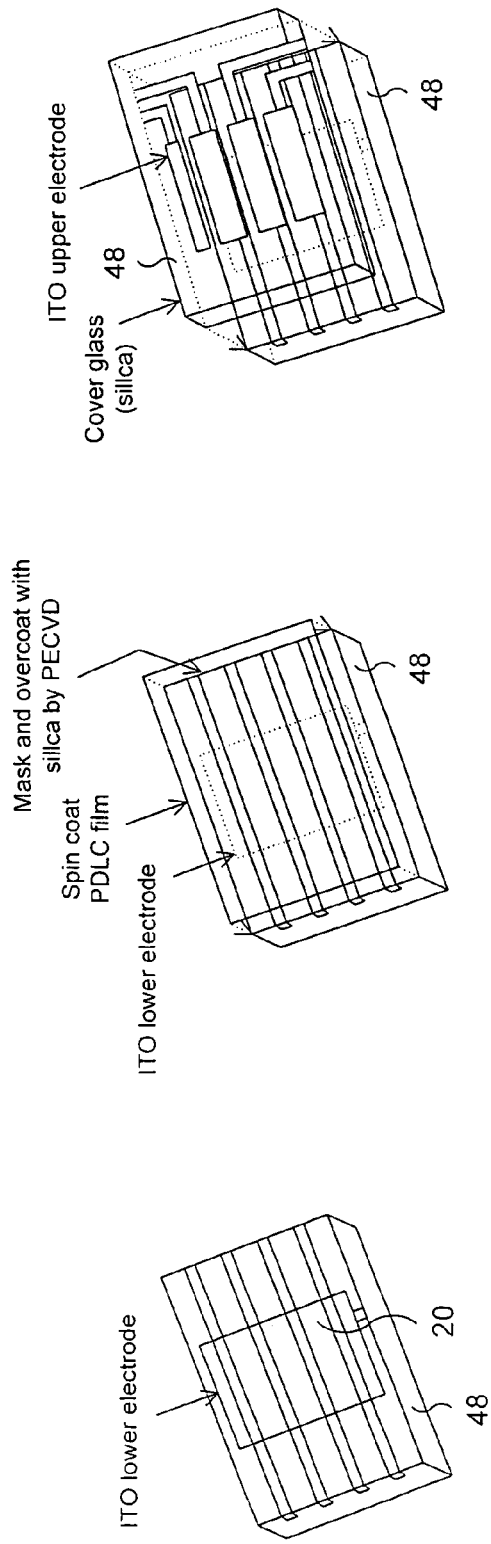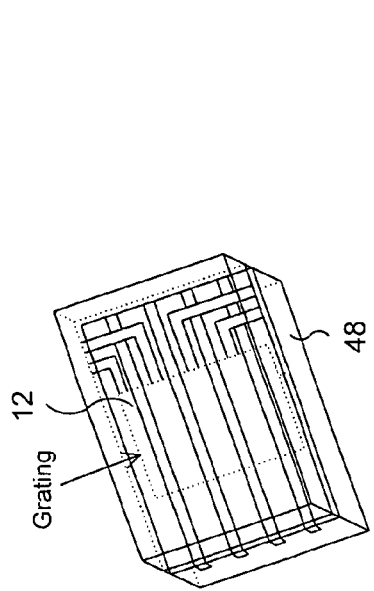

| Element | |
|---|---|
| Top cover | n = 1.44 |
| ITO | n = 1.9<br>t = 15 nm |
| ESBG, V=0 | n = 1.46<br>Δn/n = 0.03 |
| ESBG, V=Vc | n = 1.48<br>Δn/n = 0 |
| ESBG thickness | t = 4 μm |
| ITO | n = 1.9<br>t = 15 nm |
| Polish depth | h = 2 μm |
| Fiber core | n = 1.46<br>d = 8 μm |
| Fiber cladding<br>bend radius | n = 1.45<br>n = 1m |

(Not to scale)

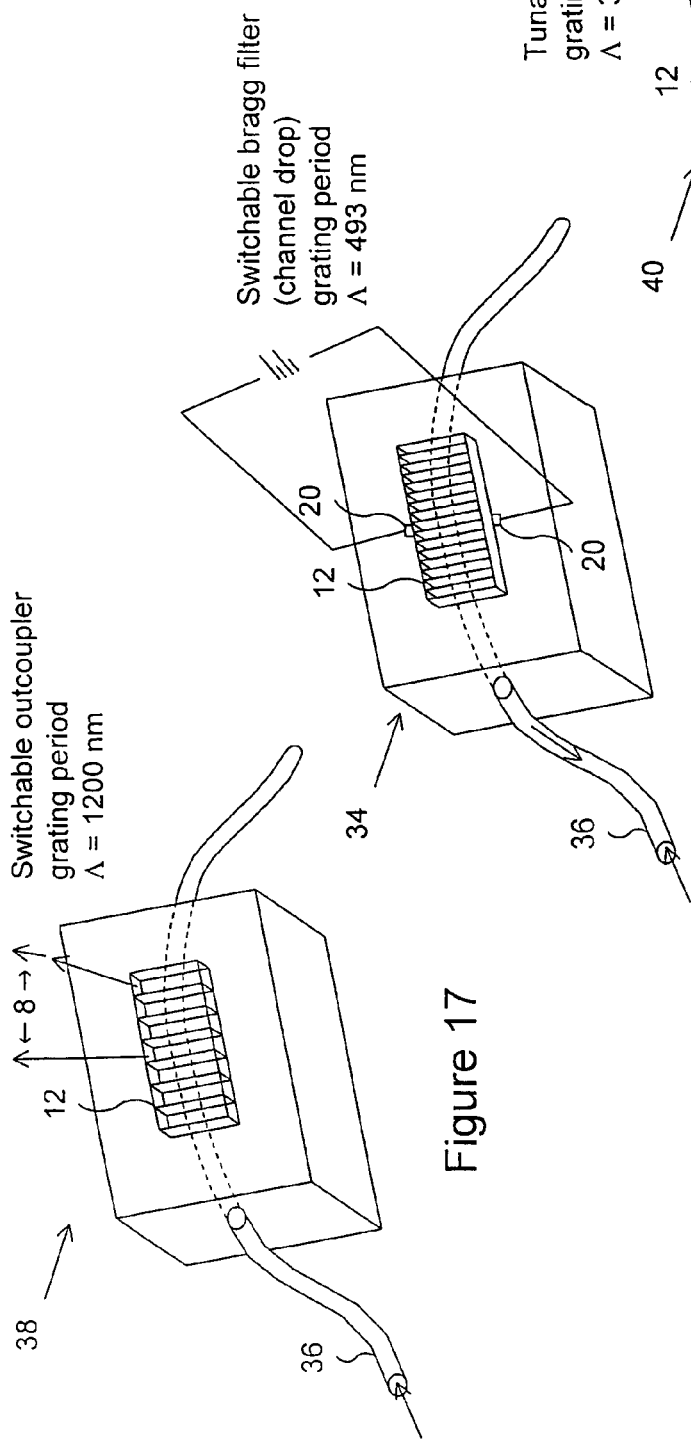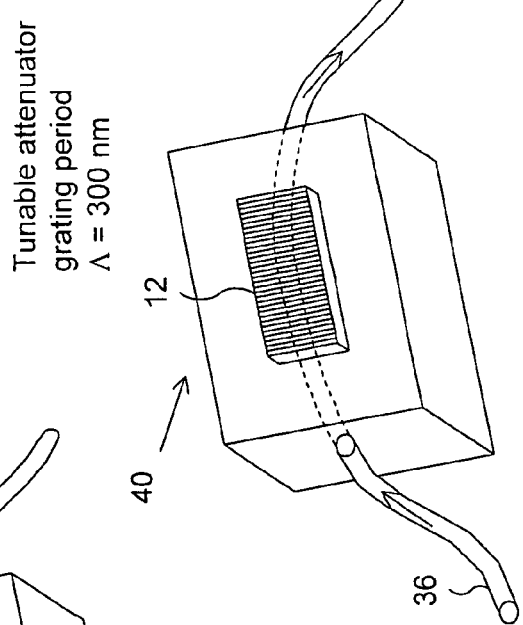

SWITCHABLE OPTICAL COMPONENTS

PRIOR APPLICATIONS

This application is a divisional of application Ser. No. 10/107,593, filed Mar. 26, 2002, now U.S. Pat. No. 6,771,857, which is a continuation in part of application Ser. No. 08/797,950 filed Feb. 12, 1997 (the '950 application) now U.S. Pat. No. 5,937,115, and claims priority from provisional specification 60/055,571 filed Aug. 13, 1997, the subject matter of both the parent application and the provisional being incorporated herein by reference.

FIELD OF THE INVENTION

This invention relates to switchable optical components, particularly ones utilizing guided wave optics and to ones particularly adapted for use in wavelength division mutliplexing (WDM) systems, including switchable waveguide gratings, particularly ones used for switchable add/drop filtering (SADF) and wavelength selective cross-connect (WSXC), to designs utilizing coupler-halves or side-polished fibers, to attenuators and other optical grating components utilizing very small period optical grating elements, to other wavelength selective or wavelength independent components, to devices using such components, to methods for the fabrication of such components and devices, and to integrated structures for such devices.

BACKGROUND OF THE INVENTION

Because of their very large bandwidth capacity, optical signals are being increasingly utilized for the transmission of data. Further, the bandwidth capacity of a given fiber optic cable can be further increased by transporting a multiplicity of independent signals within a single fiber on separate channels at slightly different wavelengths, a technique known as wavelength division multiplexing (WDM). Thus, for example, a nominally 1550 nm fiber optics signal might comprise four, eight, 64, 80 or more channels, each separated by for example approximately 0.8 nm (corresponding to 100 GHz) or approximately 1.6 nm (corresponding to 200 GHz). Multiwavelength operation facilitates an increasingly important advantage of optical transport and switching which is that several non-interacting signals may pass through the switch simultaneously, which signals convey entirely incompatible data rates, encodings and protocols in parallel without compromising one another. However, for such signals to be useful, it must be possible to wavelength selectively switch the optical signals coming in on an optical fiber, bus (or other optical conduit) to a fiber/conduit leading to a desired drop/destination, to wavelength selectively add signals from a drop to the bus or to wavelength selectively transfer signals between fibers or other optical conduits. The first two functions are sometimes referred to as switchable add/drop filtering (SADF) and the last function is sometimes called wavelength selective cross-connect (WSXC). In other applications, switching the entire fiber signal, inclusive of all wavelength channels, is required (such switching sometimes being denoted as "space switching"). In complex fiber optic structures such as those used in the telecommunications industry and for sensor and computer data networks, light signals must be efficiently routed or switched from an array of N incoming optical fibers, which fibers may be single mode or multimode, to an array of M outgoing optical fibers. Such a space switch will sometime be referred to hereinafter as an NXM switch or cross-connect.

While a number of techniques have been proposed over the years for performing NXM switching optically, none of these techniques have proved to meet all requirements simultaneously. This is partly due to the varied architectures which are required for such switches. For example, an N fiber in, N Fiber out (NXN) switch that maps each incoming fiber optical signal to one and only one fiber output is termed an NXN cross-connect. It is nonblocking if any connection is possible, without regard to earlier established connections. For some applications, reconfigurably nonblocking switches are sufficient. In other applications, switches that multicast or broadcast, sending one incoming signal to more than one output, or that perform other variant functions, are required. The data capacity demands on fiber optic networks are also becoming more complex, imposing a requirement that switching technologies be scalable so as to be extendable in a straight forward manner from small switches (for example 2×2 or 4×4 to larger switches such as 64×64, 1024×1024, and beyond). It is also desirable that such switches be integrable such that individual miniaturized switching elements can be combined with many others on a single chip or substrate to provide a larger NXN or NXM cross-connect structure. However, designing such structures, particularly for larger switches, is very complex even for single channel operation, and the complexity increases dramatically for multichannel WDM operation (i.e., wavelength selective switching with an N×M×m switch, where m is the number of WDM channels).

Another requirement for optical switches of the type described above in particular, and for optical components and structures in general, is that they efficiently interface with optical fibers, the use of which to transport high bandwidth signals over long distances is increasingly prevalent, in a manner so as to minimize coupling losses. Other key performance parameters include minimizing insertion loss, crosstalk and polarization sensitivity, insuring good optical isolation in all switch states, good spectral bandwidth, and good dynamic range for on/off contrast ratio. Low operating power, high switching speed, low power consumption, stability, long service life/temperature insensitivity and high reliability are also important. However, for many network reconfiguration and protection switching functions, switching speeds in the range of 1 microsecond to 1 millisecond are adequate and sufficient.

Further, in the present state of the art, neither space switching, nor wavelength selective switching techniques, are entirely satisfactory. One reason for this is that the various network control and reconfiguration functions required have generally been met by different and incompatible technologies. Optical network systems would be considerably advanced, in efficiency, manufacturability and cost, if several disparate network control functions could be implemented on the basis of a single underlying technology.

All-optical switching is increasingly regarded as essential for future networks. Because satisfactory products for performing such optical switching have not existed, it has therefor been necessary to convert optical signals to be switched into electrical signals for switching and to then reconvert the signals to optical signals for outputting. This technique can be expensive, time consuming, impose bandwidth limitations on the system and introduce several sources of potential error. It can also limit the flexibility of the system and is generally not an efficient way to operate.

In addition to the switching applications discussed above, there are numerous applications where a need exists to be able to change the direction in which an optical signal is passing through a waveguide, dynamically filter an optical signal, particularly a multiwavelength or multichannel signal, so as to selectively add, drop, pass or block various of the individual wavelengths or channels (or the entire signal), to selectively attenuate an optical signal, including one or more signals of a multiwavelength or multichannel line, to selectively crossconnect optical paths including multichannel or multiwavelength optical paths to facilitate the transfer of one or more channels therebetween, and/or to selectively couple the multiwavelengths or multichannels along optical paths out of the plane of the waveguide. It should be possible to perform all of these functions utilizing optical components and/or structures which are relatively easy and inexpensive to fabricate. In particular, it would be desirable if fabrication techniques could be provided which would permit complex optical networks to be fabricated utilizing a parallel, simultaneous, one-shot fabrication techniques that incorporates a multiplicity of functionalities on a single chip for the implementation of space switching, wavelength selective switching, switchable add-drop filtering, wavelength selective cross-connect switching, together with such additional functions as programmable attenuation, all on a single chip and using a single material technology rather than requiring each component to be separately fabricated.

Definitions

In the following sections, various terms will be used, which terms should be considered to have the following definitions:

"Bragg gratings or gratings" are periodic structures formed by spatially varying refractive index distributions or similar perturbations throughout a defined volume or the boundary of a guiding region. Simple Bragg gratings are periodic in one dimension. More complex diffractive structures, which for purposes of this invention will also be encompassed within this definition, may be volume holograms, diffractive lenses, or other computer generated or optically recorded diffractive index distributions, in most cases permeating a substantially three-dimensional volume, designed and fabricated for purposes of coupling an incident laser or other light beam or a light beam received through guided wave optics into a desired output state or mode either one guided mode to another guided mode, a guided mode to a free space mode or vice versa.

"Switchable gratings or switchable Bragg gratings" are volumetric gratings whose grating period index variation can be modulated, induced or caused to vanish by application of an electric field. These differ from standard gratings which are not switchable. This definition does not imply altering the period of the grating, but only the amplitude of the spatially varying index variation. A switchable grating, in the simplest example, may be described as a grating element, that, in its switched-on state, has filtering or other diffractive properties comparable to a high quality conventional fiber or waveguide Bragg grating, of either the transmission or reflection type, and in its switched-off state, effectively vanishes to be replaced with a low loss waveguide or volume of transparent optical material.

Until recently, few mechanism were available for switchable Bragg gratings. Certain semiconductor gratings can be switched, but only in limited geometrical configurations, and the dynamic range for control of the spatial index modulation is relatively small. Liquid crystal gratings, usually formed by physically structured electrodes, may be switchable, but are primarily relevant to free space non-volumetric gratings, are excessively scattering for use with fiber optic signals and are relatively slow, switching being in the millisecond range. All manner of switchable gratings that involve the use of structured electrodes to produce the spatial periodicity, such as magneto-optic materials and lithium niobate materials, are limited in their application in that the spatial period and depth of grating are dependent on the lithographic processes of fabricating electrode patterns. Such structured electrode gratings are not practical at spatial periodicities much less than one micrometer, which smaller periods are essential in various fiber optic applications, and also do not tend to produce volumetric (Bragg) gratings since the electrode periods cannot penetrate unlimited volumes.

"Holographic polymer/dispersed liquid crystals or H-PDLC" are any microdroplet composite of liquid crystal (LC) in polymers or other morphological variants including polymer networks with interpenetrating LC. This family of switchable gratings is based on microdroplet dispersions of liquid crystals in a polymer host, the volume gratings containing periodic structures with periods as small as 200 nanometers or less which are achieved by holographic recording and photopolymerization processes. The switching of such gratings is achieved by applying an electrical field by means of a uniform, monolithic electrode to the entire grating region, as opposed to producing the grating by patterning the electrodes. Examples of H-PDLC include, but are in no way restricted to, the following:

1. R. L. Sutherland, L. V. Natarajan, V. P. Tondiglia, T. J. Bunning, Bragg Gratings in an Acrylate Polymer Consisting of Periodic Polymer-Dispersed Liquid-Crystal Planes, Chem. of Materials, 1993, 5, 1533.38.
2. R. L. Sutherland, L. V. Natarajan, V. P. Tondiglia, T. J. Bunning and W. W. Adams, Development of Photopolymer/Liquid Crystal composite Materials for Dynamic Hologram Applications, Proc. SPIE Vol. 2152, paper 38.
3. V. P. Tondiglia, L. V. Natarajan, R. L. Sutherland, T. J. Bunning and W. W. Adams, Volumn holographic image storage and electro-optic readout in a polymer dispersed liquid crystal film, Opt. Lett. v. 20, p. 1325, 1995.
4. R. L. Sutherland, L. V. Natarajan, V. P. Tondiglia, T. J. Bunning and W. W. Adams, Switchable holograms in a new photopolymer-liquid crystal composite, Proc. SPIE, Vol. 2404, p. 132, 1995.
5. R. L. Sutherland, L. V. Natarajan, V. P. Tondiglia, T. J. Bunning and W. W. Adams, Electrically switchable volumn gratings in PDLC, Appl. Phys. Lett., Vol. 64, p. 1074, 1994.
6. U.S. Pat. No. 4,938,568. Jul. 3, 1990. John D. Margerum, et al.
7. U.S. Pat. No. 5,096,282. Mar. 17, 1992. John D. Margerum, et al.
8. A. Golemme, B. L. Volodin, B. Kippelen, and N. Peyghambarian, Photorefractive Polymer-Dispersed Liquid Crystals, Optics Letters, Vol. 22, No. 16, p. 1226–1228, Aug. 15, 1997.
9. Keiji Tanaka, Kinya Kato, Shinjui Tsuru, and Shigenobu Sakai, Holographically Formed Liquid-Crystal/polymer Device for Reflective Color Display, Journal of the SID, Vol 2, No. 1, p. 37–40, 1994.

10. Emily W. Nelson, Adrian D. Williams, Gregory P. Crawford, Louis D. Silverstein, and Thomas G. Fiske, Full-Color Reflective Displays, IS&T's 50th Annual Conference, p. 669–673.

11. G. Crawford and S. Zumer, Liquid Crystals in Complex Geometries Formed by Polymer and Porous Networks, Taylor and Francis, 1996, London.

"Electronically switchable Bragg grating or (ESBG)" any of an extensive range of devices and device geometries realized utilizing the H-PDLC materials technology.

SUMMARY OF THE INVENTION

In accordance with the above, this invention provides a component for selectively reconfiguring an optical signal on a guided wave optical path which path may for example be a waveguide formed in a composite optical structure. The component includes at least one ESBG in optical contact with the path, and electrodes for selectively applying at least a first and a second voltage across the ESBG, there being no change in the optical signal for the path when the first voltages is across the ESBG and there being a selected change in the optical signal on the path when the second voltage is across the ESBG. Where the optical signal is a multichannel WDM signal, a selected channel may be dropped from the path when the second voltage is across the ESBG, the dropping occurring either by the channel being reflected back through the path or being dropped/outcoupled from the path through the ESBG.

The component may include a second guided wave optical path which is optically coupled to the ESBG, with at least one selected channel being transferred between the paths when the second voltage is across the ESBG. In particular, a channel may be either dropped or added to the optical path by being transferred between the optical path and the second optical path through the ESBG when the ESBG has a second voltage thereacross. Where WDM signals appear on both paths, WSXC transfer of at least a selected channel may be performed between the paths when a second voltage is across the ESBG.

A plurality of ESBGs or ESBG components may be optically coupled to both paths, with a different channel being transferred between the paths by each ESBG when the second voltage is thereacross. For some embodiment of the invention, there is an ESBG in optical contact with each of the paths and at least one optical path interconnecting the ESBGs, there being two optical paths interconnecting the ESBGs to form a ring for a generally preferred embodiment. One of the rings may be provided between the paths for each WDM channel to be transferred between the paths. The two signal-carrying optical paths preferably have the same first effective index, with the optical paths of the rings having a second effective index different from that of the first index, the different effective indices being achieved for example by having the optical paths of the ring of different size than that of the main optical paths.

The optical paths may also have different indices which may be accomplished for example by having the optical paths be of different size. The difference in the indices of the gratings is preferably greater than or equal to the index contrast Δn of the ESBG grating.

Rather than being integrated optics, the component may also be a switchable coupler half device, for example a switchable drop filter, a switchable outcoupler, or a switchable attenuator. For such an attenuator, the ESBG has a submicron grating.

The ESBG may also be part of a resonator. When the resonator is being used in a channel drop filter, the component includes a first drop resonator and second reflector resonator spaced from each other in the direction of travel of the optical signal on the optical path by an integer number of wavelengths of a wavelength to be dropped, plus a half wavelength. Each resonator may also be a multipole resonator formed of resonator sections which are either series coupled or parallel coupled. The resonator component may also be a guide channel dropping filter with the resonator being between the optical paths. The resonator may also be a split resonator having a phase delay section between the split resonator sections.

Where there are two waveguides or optical paths, the ESBG may be in the cladding for both optical paths which claddings overlap. Where the claddings of the two optical paths do not overlap, the ESBG may extend over or overlie both optical paths to affect interconnection. For any component involving two optical paths, sidelobes may be suppressed by apodization. As previously indicated, all of the above are preferably effected through use of integrated optics technology except for the half coupler embodiments.

For half coupler embodiments, an optical fiber having a core with cladding therearound is provided, the core having an index $n_1$, the cladding having an index $n_2$, and the effective index of the fiber being $n_e$, the cladding being at least partially removed in a selected region. An ESBG is mounted to the fiber in the region, the ESBG having an index $n_B$ when in a first state, where $n_B$ is substantially equal to $n_2$. Electrical elements including electrodes are also provided for selectively applying a voltage across the ESBG, the effect which the ESBG has on light applied to the ESBG varying as the voltage thereacross changes, thereby changing the state of the ESBG. Light applied to the optical fiber is substantially unaffected by the ESBG when the ESBG is in its first state, this for example occurring when the mechanism applies substantially no voltage across the ESBG. Variation in $n_B$ as a result of voltage changes across the ESBG may result in selective attenuation of light applied to the fiber, particularly if the ESBG has a grating with a subwavelength. Such attenuation is generally substantially independent of wavelength.

The ESBG may cause light at one or more selective wavelengths to be coupled through the ESBG in at least one direction to or from the fiber as the voltage across the ESBG is varied from the voltage causing the ESBG to be in its first state. The ESBG grating may also have a period which causes light at one or more selected wavelengths to be reflected back along the fiber, thereby filtering such one or more selected wavelengths from light propagating in the fiber. Two of the fibers may be provided, with the regions of the fibers having cladding remove being adjacent and with an ESBG being mounted between the fibers in both regions. For this configuration, all light on one of the fibers passes unchanged through the ESBG to the other fiber when the ESBG has a selected index. When the fibers have substantially the same index, a light applied to one of the fibers is transferred through the ESBG to the other fiber when the ESBG is in its first state. When the ESBG is in a second state as a result of a voltage applied thereacross, light of at least one selected wavelength determined by the period of the grating is blocked from passing through the ESBG, such light continuing to propagate on the original fiber. The fibers may also have different indices in which case, for at least one wavelength of a multiwave light signal for which the condition $2\pi/\Lambda = \beta_i - \beta'_i$ is satisfied, where $\Lambda$ is the period of the grating and $\beta_i$, $\beta'_i$ are the propagation constants for the two fibers respectively, there is coupling between the fibers only for such wavelength. Where the fibers have different indices, it is preferable that the difference in their effective index be greater than or equal to the index contrast $\Delta n$ of the ESBG grating.

The invention also includes providing an ESBG having a subwavelength grating, which grating may have a period substantially less than 0.5 $\mu$m. Such a subwavelength grating may be obtained by exposing a H-PDLC film by one of (a) exposing the film with two interfering light beams of suitable wavelength, the half angle $\theta$ between the beams being large enough so that sin $\theta=\lambda/2\Lambda$, where $\lambda$ is the center wavelength of a light signal with which the ESBG is to be utilized; (b) exposing the film through a suitable binary phase mask; (c) exposing the film through a master grating.

Integrated optical networks each having a plurality of nodes, with at least one ESBG formed at each node, may be formed by forming selected optical waveguides in a suitable substrate, at least selected ones of the waveguides passing through selected ones of the nodes, forming an ESBG with electrodes at each node and covering the waveguides and ESBGs. The ESBGs may be formed by forming an electrode film and a H-PDLC film at each node, and exposing the H-PDLC film at each node to form the ESBG grating thereon. The covering of the waveguides and ESBGs may be accomplished by forming a second electrode film on a cover plate at each node and covering the waveguides/H-PDLC film with the coverplate, each electrode on the coverplate overlying the H-PDLC film for the corresponding node. The exposing of the H-PDLC film may be accomplished by one of (a) exposing each H-PDLC film with two interfering light beams of suitable wavelengths, the beams being at a selected angle to each other; (b) exposing all the films simultaneously through a suitable binary phase mask; (c) and exposing each of the films through a suitable mask. Selected optical waveguides may also be formed in a first substrate and in a second substrate, which substrates are mounted adjacent each other during the covering step, the waveguides on the two substrates intersecting at at least selected nodes. For this embodiment, a H-PDLC film, with ESBG gratings formed therein at the nodes, is either formed on one of the substrates or independently formed and mounted between the substrates. An electrode film may be formed on each substrate on a waveguide at each node.

Finally, the invention includes an integrated optical network having N guided wave optical inputs and M guided wave optical outputs, the network including an optical waveguide connected to each input and to each output, the waveguides intersecting at nodes, and an ESBG switch component at each node which is operative to either pass an optical signal on one waveguide intersecting at the node on the waveguide or to transfer at least a portion of such optical signal to the other waveguide intersecting at the node, depending on the state of the ESBG. For WDM signals, an ESBG switch component may be provided at each node for each wavelength to be transferred at the node. For preferred embodiments, all the waveguides have substantially the same index $n_1$, the ESBG switch component at each node includes an ESBG having a grating with an index $\Delta n$ in optical contact with each waveguide and at least one waveguide interconnecting the ESBGs, the waveguide connecting the ESBGs having an index $n_2$, where $n_1-n_2 \geq \Delta n$.

The foregoing and other objects, features and advantages of the inventions will be apparent from the following more particular description of preferred embodiments of the inventions as illustrated in the accompanying drawings.

IN THE DRAWINGS

FIGS. 2a and 2b are schematic representations of a transmission ESBG in the off-state and on-state respectively.

FIGS. 3a and 3b are schematic representations of a reflection ESBG in the off-state and on-state respectively.

FIGS. 4a and 4b are schematic representation of a single switchable waveguide component in the on-state and off-state respectively.

FIG. 5b is a schematic representation of the various coupling modes which potentially exist in the filter of FIG. 5a.

FIG. 5e is a schematic representation of an integrated planar four-channel array filter utilizing the components of FIG. 5a.

FIG. 7a is a graph comparing the filter response of the crossconnect shown in FIG. 6a with the filter of FIG. 5a.

FIG. 7b is a graph showing details of the throughput response for the crossconnect of FIG. 6a.

FIG. 11 is a graph of an illustrative response for a matched bus resonator of the type shown in FIG. 10a.

FIGS. 12a, 12b, 12c, 12d and 12e illustrate a method for the fabrication of an integrated array in accordance with the teachings of this invention.

FIG. 14a is a schematic representation of a coupler half device in accordance with the teachings of this invention and FIG. 14b is a chart of indices and dimensions for various components of for device of the type shown in FIG. 14a.

FIG. 15 is a schematic representation of a switchable Bragg filter employing a coupler half device in accordance with the teachings of this invention.

FIG. 17 is a schematic representation of a switchable outcoupler utilizing coupler half technology in accordance with the teachings of this invention.

FIG. 18 is a schematic representation of a tunable attenuator utilizing coupler half technology in accordance with the teachings of this invention.

Figure 19A:
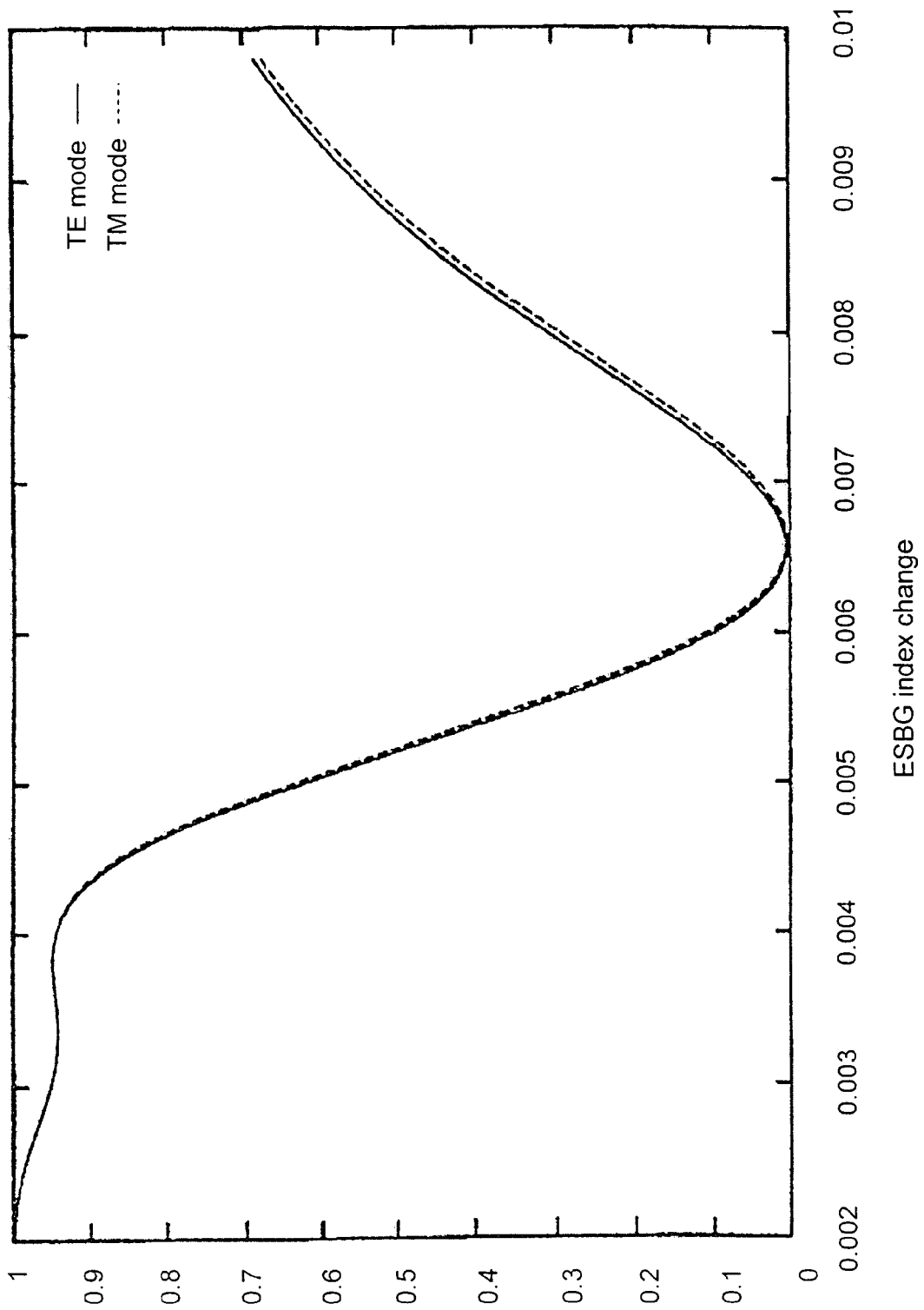
Figure 19B:
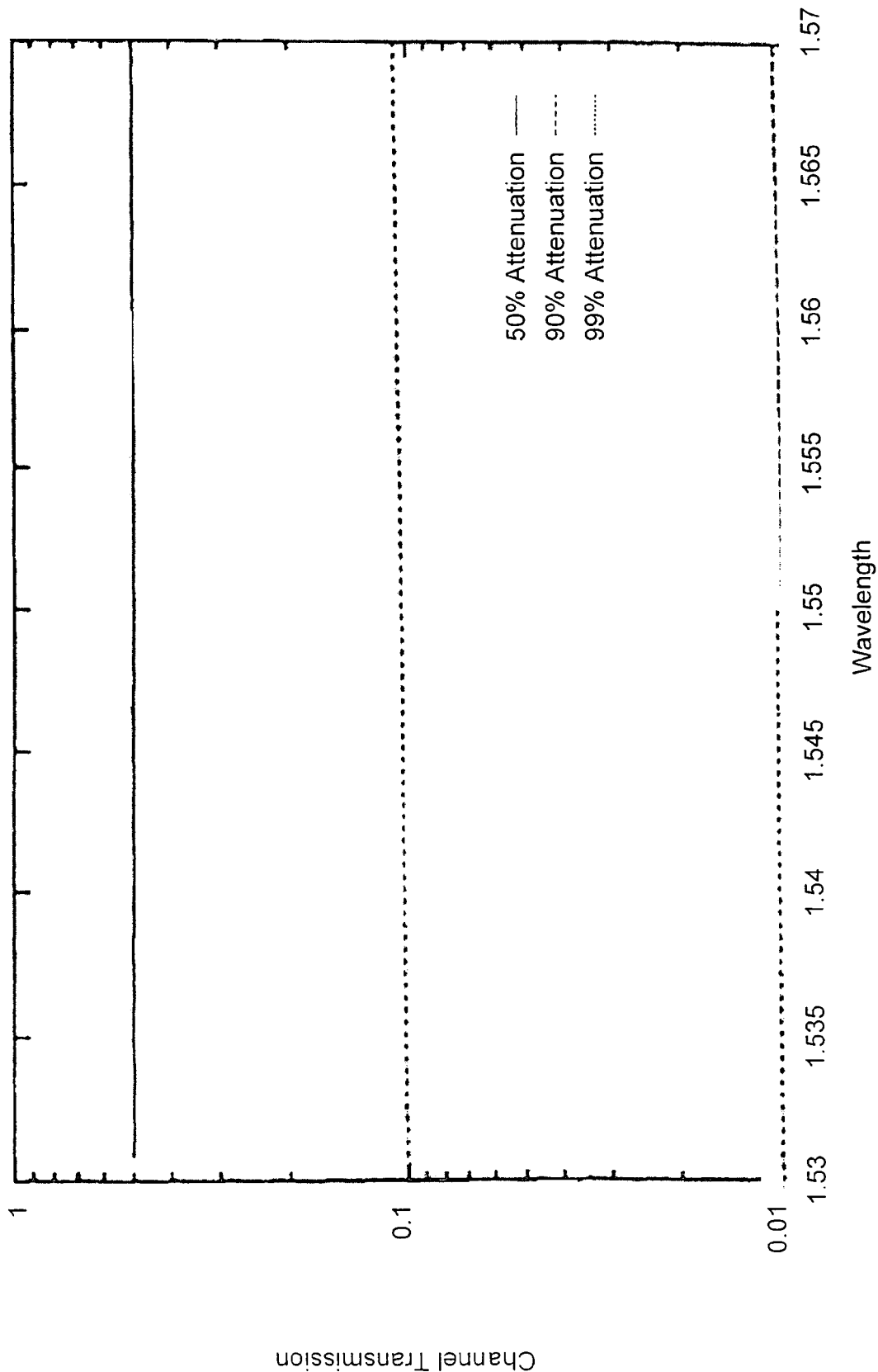

FIG. 19*a* is a graph showing the optical power transmitted through the fiber as a function of electro-optically altered ESBG index for two different polarizations and FIG. 19*b* is a chart illustrating the power transmitted as a function of wavelength for three levels of attenuation.

Figure 20:
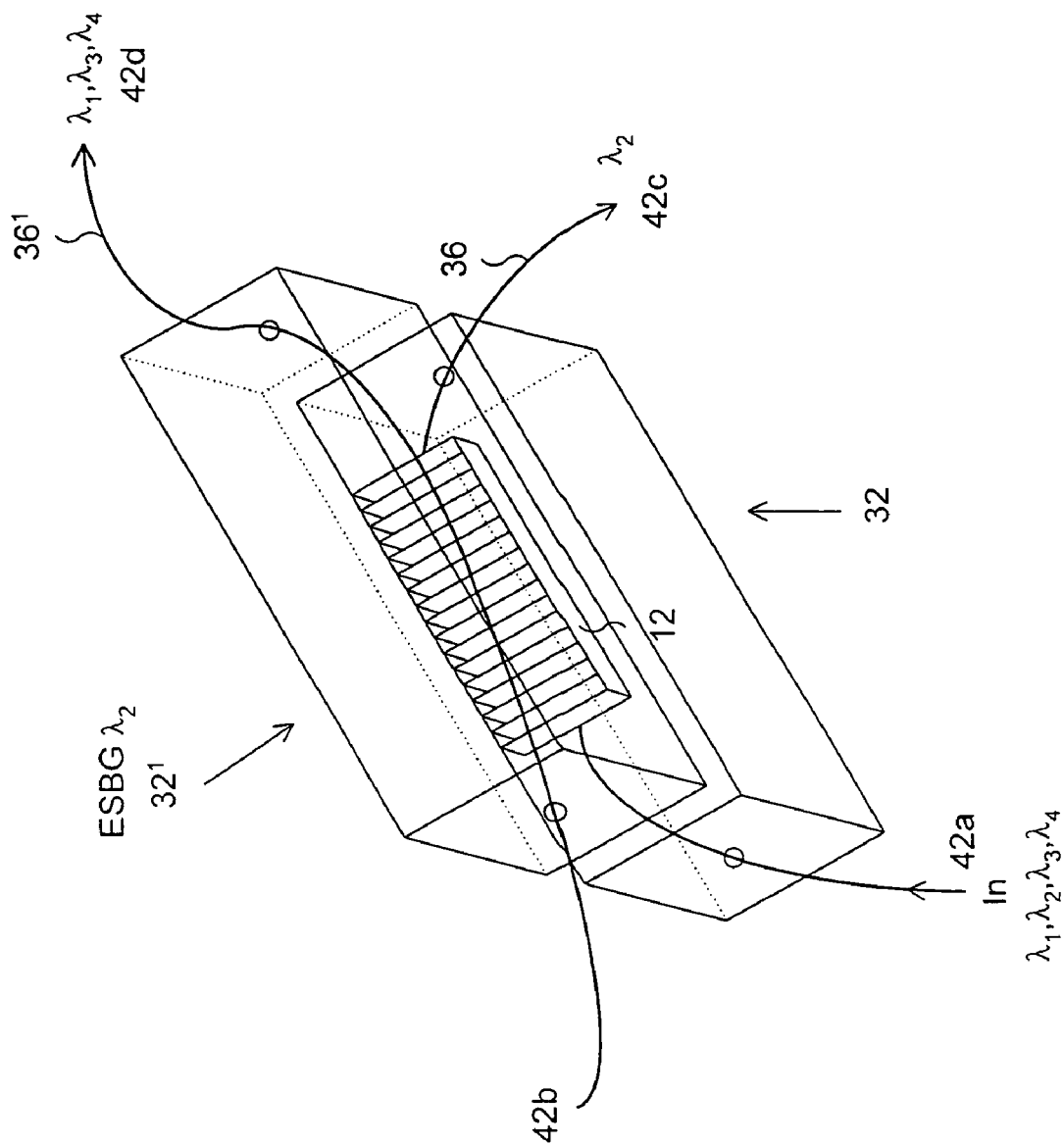

FIG. 20 is a schematic representation of a channel add/drop crossconnect device utilizing half coupler technology in accordance with the teachings of this invention.

Figure 21:
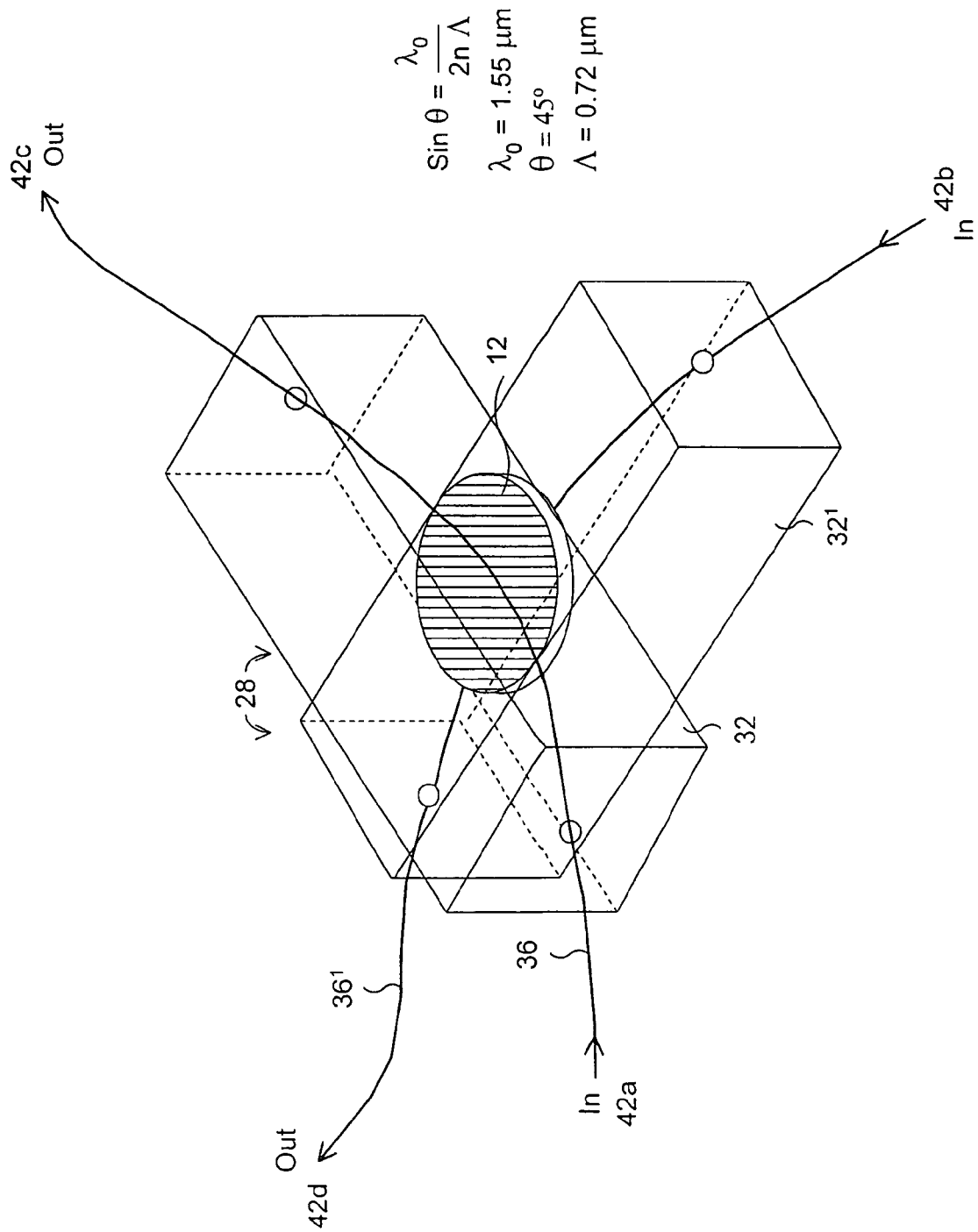

FIG. 21 is a schematic representation of a 2×2 space switch utilizing half coupler and ESBG technology.

Figure 22A:
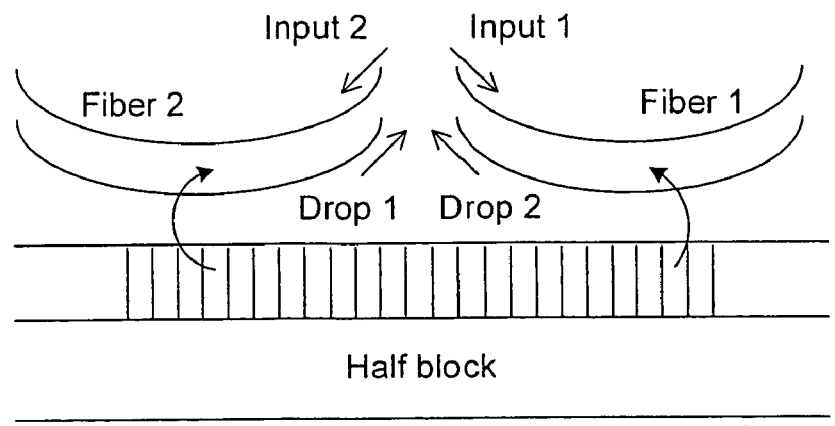
Figure 22B:
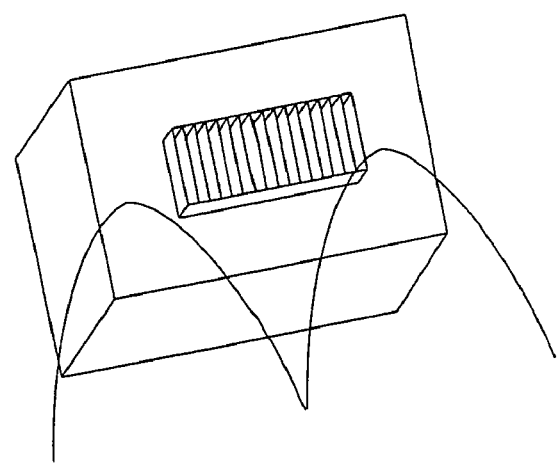

FIGS. 22*a* and 22*b* are schematic representations of a grating assisted coupler between two fibers.

Figure 22C:
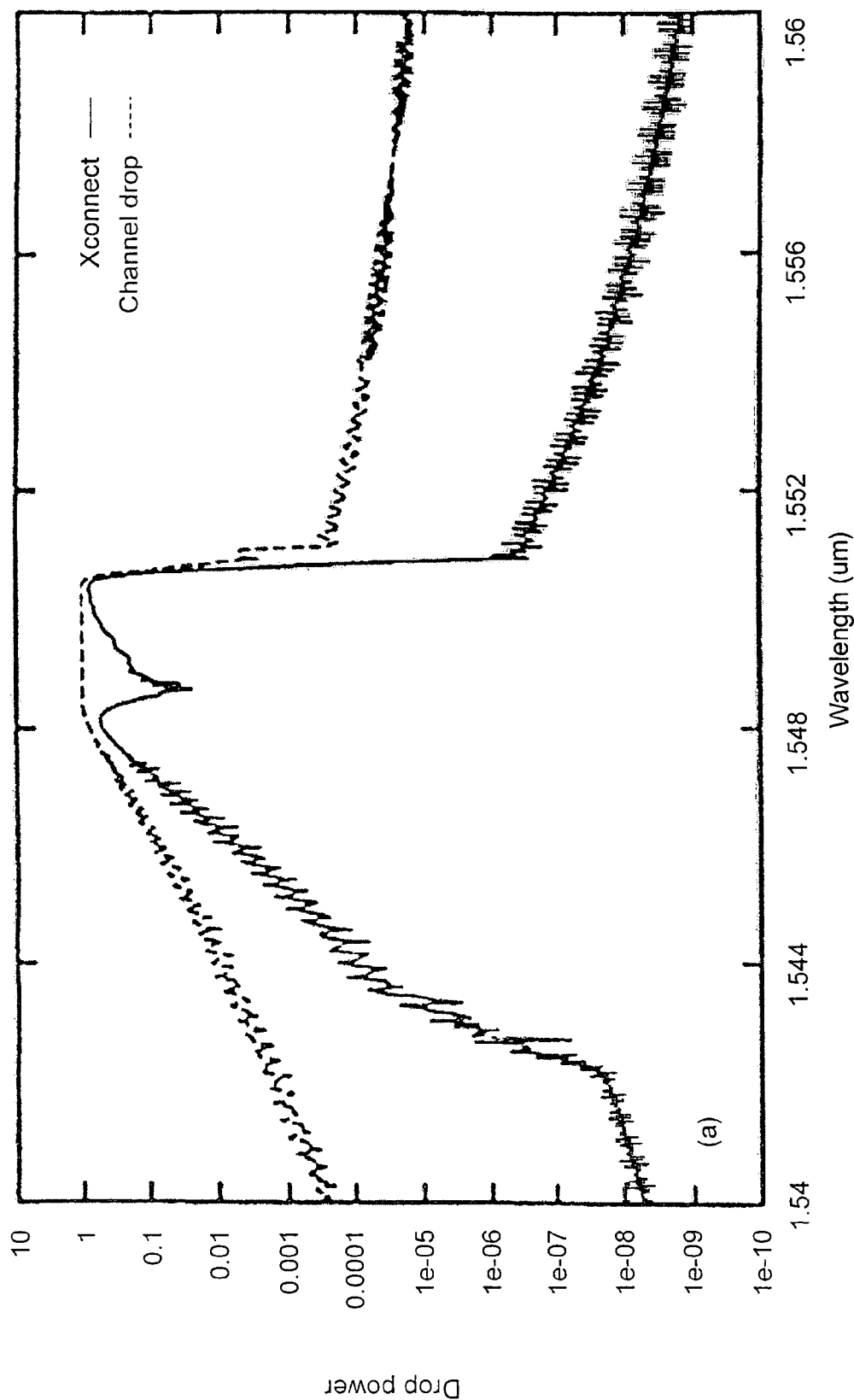

FIG. 22*c* is a graph illustrating performance for the coupler of FIGS. 22*a*, 22*b*.

DETAILED DESCRIPTION

Figure 1A:
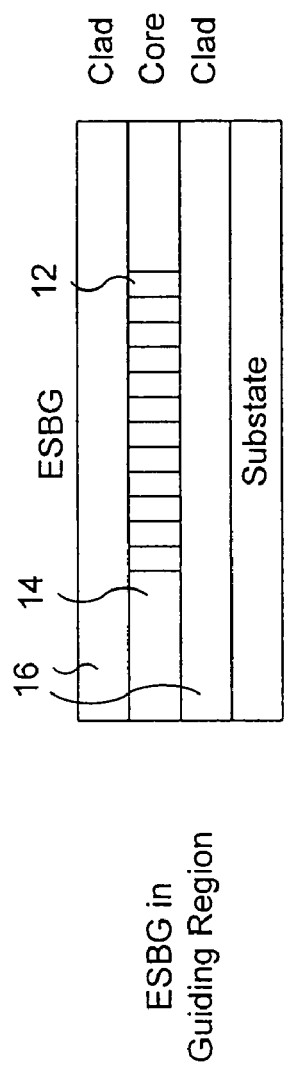
FIGS. 1a and 1b are schematic representations of a waveguide with an ESBG in the core region and cladding region respectively.
Figure 1B:
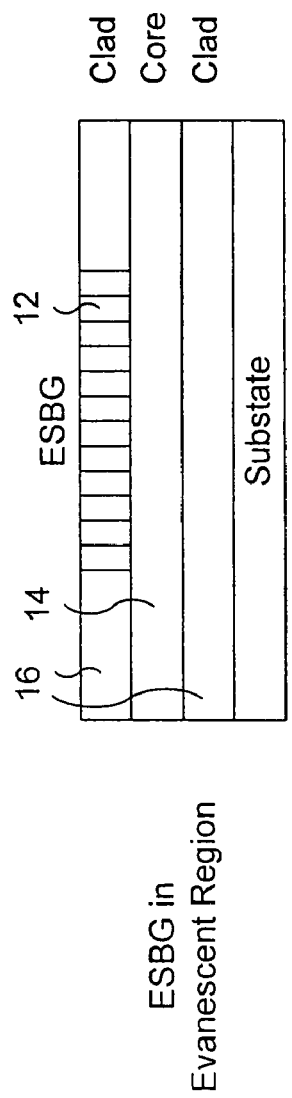

The '950 application teaches a variety of free space, waveguide and fiber optic components utilizing ESBG technology to perform various switching, reflection, filtering, routing and other functions for optical signals on single wavelength or multiwavelength lines. Bragg gratings may be classified as freespace or waveguide gratings, and within each category as transmission or reflection gratings. ESBGs corresponding to each such type converting each to a switchable form. As illustrated in FIG. 1A, an ESBG 12 may be located in the core or guiding region 14 of a planar waveguide or, as illustrated in FIG. 1B, the ESBG 12 may be in the evanescent or cladding region 16 thereof. As was indicated in the '950 application, ESBGs may be utilized to perform a variety of functions; however, these functions may be generally characterized as transmission or reflection functions. Since the desirable characteristics and appropriate designs of ESBGs when used for transmission are different than when used for reflection, the ESBGs employed for these functions are also somewhat different in their geometry, materials properties, periods, magnitude of spatial index modulations, and other parameters.

In particular, transmission gratings are used for the spatial diversion of beams into an alternative path, primarily without discrimination as to wavelength channel, and are therefore useful for 2×2 space switches, including free space, optical fiber and planar waveguide 2×2 space switches. (The term "space switches" should not be confused with "free space switches." Space switching means diversion of the path of an entire beam or guided wave. Free space propagation refers to unguided light beams.) Since this application relates mostly to guided waves in waveguides and/or optical fibers rather than free space switching, free space 2×2 switches will not be discussed further, the discussion below relating almost entirely to guided wave structures.

Transmission Gratings

For transmission gratings, the diffraction efficiency at the Bragg matched angle and wavelength is given by the approximate formula $$d.e. = \sin^2 \pi [\Delta nL/\lambda \cos \theta]$$ Eq. (1)

where $\theta$ is the Bragg angle, $\lambda$ is the wavelength, L is the interaction length, and $\Delta n$ is the magnitude of the spatial index modulation, which can be controlled over a wide range, (approximately $\Delta n \approx 0.001 - 0.05$) by varying the formulation and processing of the H-PDLC, this being one of the advantages of this material system for ESBGs.

Complete diffraction means that d.e.=1, or $\Delta nL/\lambda \cos \theta = \frac{1}{2}$. (Although the principle remains valid, this formula varies significantly when describing coupling within a single mode waveguide, and should be further modified depending on whether the grating is in the core or overlay region, but as a general rule it shows the essential dependencies on basic parameters.) For beam steering efficiency, it is desirable for $\Delta n$ in a transmission grating to be relatively large, for example 2–5%, and thereby for L to be small, for example $\approx 50 \mu m$. In such a grating, the wavelength dependence of the coupling is relatively weak, since a 1% change in $\lambda$ would cause only about a 1% change in coupling strength.

The orientation of an ESBG 12 having a transmission grating and its electrodes 20 are indicated in FIGS. 2*a* and 2*b*; the Bragg planes are as indicated, with the grating vector 22 approximately transverse to the direction of the incident beams 24. The grating vector is a term of art for a vector perpendicular to the planes of the grating, whose length or magnitude is inversely proportional to the spacing of the planes. In FIGS. 2*a* and 2*b*, the grating vector is in the "y" direction. While FIGS. 2*a* and 2*b* illustrate in the simplest case a free space transmission gratings, it should also be understood that similar structures may be placed in guided wave, confined regions.

Looking further at FIGS. 2*a* and 2*b* and the ellipsoidal "footballs" 26 of liquid crystal microdroplets illustrated as being distributed within the Bragg planes of the ESBG film, it can be seen that in order to effectively reorient the liquid crystal molecules within each droplet, and to apply the voltage across the shortest possible distance to produce the largest possible field, then in the free-space case, only one choice for for electrode positions is available with respect to the substantially planar structure shown. Viewing the devices from above the planar structure, the electrodes must be on the "front and back" of the grating (considering the side where light enters to be the front). However, for transmission gratings in a waveguide geometry, where the three dimensions of the grating volume may be approximately comparable, additional choices are available, and the electrodes may be applied as described above or else to the top and bottom (or right side/left side). Although either of these geometries can be considered useful in principle, in the case of waveguide gratings, the substantially planar structure and thinness of the films dictate that the top-bottom electrode placement is normally the practical choice. (For nonplanar, free space applications in which the ESBG is not a thin film substantially parallel to the propagation of the light, but rather a thin film normal to the propagation of the light, either choice would be viable, with the choice in specific applications depending on the birefringence of the liquid crystals and their index relationships to the other components.)

The physical locus of a transmission grating containing ESBG within the planar device may be in either the core region 14 or the overlay (also known as the cladding or evanescent) region 16, as shown in FIGS. 1*a* and 1*b*. The interaction with the grating is stronger in the former case, but losses may be substantially reduced in the latter case. A choice between these alternative designs may be dictated for specific devices based on numerical modeling and computer simulations which predict performance to a high degree of accuracy, including estimates of losses, and allow evaluation of relative advantages of alternative fabrication paths. In general however, it may be considered that both geometries are available for use with H-PDLC based ESBGs and for many purposes may be functionally equivalent. Notwithstanding this functional equivalence, the overlay geometry provides relative ease of fabrication, together with advantages of using continuous, low-loss waveguides or optical fibers; however, for many applications the core geometry provides superior overall performance.

Reflection Gratings

ESBGs 12 containing reflection gratings in a planar, waveguide context are produced so that the orientation of the Bragg planes is as indicated in FIGS. 3a and 3b, thereby reflecting part of the propagating wave into the backward direction, with the center of wavelength band reflected determined according to the formula $\lambda = 2n_{eff}\Lambda$, where $n_{eff}$ is the effective mode index of the film and $\Lambda$ is the physical period of the grating. In reflection gratings, it is desirable to emphasize the wavelength selective properties because the primary application is switchable wavelength filtering for WDM channel discrimination. The spectral width of the reflection notch must be calculated using known mathematical models of waveguide design, but is approximately $$\frac{\delta\lambda}{\lambda} \cong \frac{3}{4}\left[\left(\frac{\Lambda}{L}\right)\left(\frac{\Delta n}{n}\right)\right]^{1/2} \qquad \text{Eq. (2)}$$

In this case, unlike the transmission grating, it is desired that $\Delta n/n$ be as generally small, 0.1% or less, and L should be as long as possible, up to 2000–3000 $\mu$m. In the art of H-PDLC chemistry, this can be accomplished by adjusting downward the amount of liquid crystal contained in the pre-ESBG solution or otherwise altering the chemical formulation and varying processing conditions accordingly. The reflectivity of a reflection grating exactly at the center wavelength is approximately $$\text{Reflectivity} \approx 1 - 4e^{[-(\Delta n/n)(L/\Lambda)]} \qquad \text{Eq. (3)}$$

which is desired to be nearly =1. This can be accomplished even if $\Delta n/n$ is small (about 0.001) provided $L/\Lambda$ is large (about 4000).

Thus whereas transmission gratings for space switching (beam steering or coplanar coupling) are optimized when L is small and $\Delta n$ is large (which for educative purposes may be informally described as a "short, fat grating"), reflection gratings for wavelength filtering are optimized when L is long and $\Delta n$ is small (long, skinny grating). A major advantage of the H-PDLC materials family underlying ESBGs is the ability to accommodate both of these requirements within one family of devices, and even applying this variation to several elements on one device substrate, by altering formulation and processing over a range not possible with other materials family, and therefore to be able to combine these two disparate classes of elements within one manufacturing process, on one substrate. This range of possibility does not exist, for example, with semiconductor gratings illustrating the multifunctionality disclosed herein with respect to ESBGs.

A further distinction between transmission and reflection gratings may be seen in FIGS. 2a–3b in terms of electrode placement. The grating vector 22 in a reflection grating is located substantially collinearly with the forward and backward propagating light (i.e. in the "x" direction), a completely different direction than for transmission gratings where the grating vector is in the "y" direction. The aspherical microdroplets 26 ("footballs of liquid crystals") within the ESBG 12 are always oriented parallel to the grating vector; thus the microdroplets for reflection gratings are elongated in the same direction as the light propagation (unlike the transmission grating, where the elongation was substantially perpendicular to the direction of light propagation). Consideration of the liquid crystal "footballs" and the orientation of the LC molecules within them shows that in order for the electric field to be effective in reorienting them, the electrodes for a reflection grating can only be placed on the top and bottom of the grating or on the sides of the grating. To optimize the effect of the electric signal, the electrodes should be across the shorter one of these dimensions. This is straightforward in the case of thin film reflection gratings. All of the planar devices to be hereinafter discussed, both transmission gratings and reflection gratings, will use electrodes 20 parallel to the plane of the substrate and coated in layers above and below the ESBG overlay film, since this is normally the preferred configuration. However, other configurations are within the contemplation of the invention.

As in the case of transmission gratings, reflection gratings can in principle be placed either in the core region 14 or overlay region 16 with similar functionality, and the advantages/disadvantages of each will also be the same as for reflection gratings.

Since the detailed physics and chemistry of H-PDLC may be understood from the cited references, the simplified physical model displayed in FIGS. 2 and 3 is solely for the purpose of assisting with a physical appreciation of the fundamentals of ESBG design variants using H-PDLC. Therefore, the description herein of H-PDLC microdynamics may be oversimplified or may be altered by improved scientific understanding of H-PDLC in the future, without significantly altering or limiting the inventions herein described.

Requirements on a H-PDLC Formulation for Waveguides.

There are two requirements on the refractive index n of the H-PDLC formulation that will lead to low loss structures with the functional flexibility described above.

First, the H-PDLC formulation must be subject to chemical adjustment of proportions such that the index spatial modulation $\Delta n/n$ can be designed over a wide range after holographic exposure, from less than 0.01% (reflection gratings, long and skinny) up to 5% (transmission gratings, short and fat). Whatever index spatial variation is produced in this way in the unpowered state of the grating, this spatial variation will subsequently be controlled, increased or decreased in amplitude, as an electric field is applied to the film on the order of for example 1–10 V/$\mu$m. Whether the electrical field acts on the one hand to suppress the spatial index modulation, ideally to point of vanishing, or alternatively if the electrical field acts to induce a substantial index modulation, depends on the details of liquid crystal droplet morphology, whether the gating is used in a transmission or reflection mode, the direction and polarization of the light guided wave, and other factors. The inventions contemplated here may therefore be switched between grating-active and grating-inactive states either by the application or removal of an appropriate electrical field, which difference does not substantially alter the described optical functionality.

Also, it is highly desirable in certain of these structures to provide a H-PDLC formulation that results, after exposure and processing, in an average index n that varies (over the same range resulting from application of an electric field) over the typical single mode dielectric core/cladding range of 1.48/1.46, in order to couple to optical fibers, in order to interact with optical fibers in coupler-half based devices, or otherwise to index match desirable silicon dioxide (silica) claddings such as may be formed on silicon substrates by known methods of deposition. However, in other devices where direct contact with silica or optical fibers is not contemplated, higher index H-PDLC in the range of N=1.53 or higher, may be utilized, this being a range for coupling and interfacing with other polymer waveguides.

Switchable Waveguide Grating.

FIGS. 4a and 4b illustrate the waveguide Bragg grating which is the basic building block of all the planar designs hereafter to be considered. This simple ESBG, connected as a transmission grating in an integrated structure, has a bus or waveguide 31, only the core 12 of which is shown, embedded in a substrate 33 of for example silicon, and has an ESBG 12 formed in or mounted to its core. An electric signal is applied to the ESBG through electrodes 35. FIG. 4b illustrates the situation when no voltage is applied to the ESBG, resulting in the ESBG having an index free of spatial periodic variations, which substantially matches that of the waveguide, so that all channels of a WDM signal applied to waveguide 31 passes through waveguide 31 without change. In FIG. 4a, when a suitable voltage is applied to ESBG 12, the grating alters the effective index of the waveguide for at least one wavelength of the incoming signal, illustrated as $\lambda_2$ in FIG. 4a, causing this signal to be reflected or dropped from the transmission at the ESBG, while the remaining channels of the incoming signal pass undisturbed. The channel or wavelength which is reflected or dropped will vary as a function of the period $\Lambda$ of the ESBG grating.

The fabrication process for such an ESBG generally involves depositing the grating upon a silicon micro-optical structure using one of several processes. On such process of fabrication involves depositing a H-PDLC liquid precursor solution by application onto silicon that contains a relief groove or V groove, and which has been further prepared by oxidation to form a silicon dioxide optical cladding for the waveguide. Lower electrodes may also have been deposited on the silicon, or else the silicon itself, conductively doped, may serve as the common lower electrode. The H-PDLC is then polymerized by holographic lithography using interfering laser beams (whose wavelength may be visible or UV depending upon the chemistry of the chosen H-PDLC variant), or else by a single laser beam together with a binary phase mask, as is known in the art of fiber Bragg gratings. Following polymerization, a mask and etching process removes the H-PDLC from all regions not constituting the ESBG section. The passive waveguiding sections are then filled in by spincoating with a second, passive polymer, index matched to the H-PDLC.

Whereas this process is useful for H-PDLC whose index nearly matches and is slightly greater than silicon dioxide (N≈1.44), a different process is appropriate for H-PDLC formulations whose index may be higher, such as 1.53. In this case, after application of a lower conductive electrode, the cladding should also be an appropriate polymer of slightly lower index. In this process alternative, the silicon forms a mechanical planar substrate without grooves. Several polymer films may be deposited sequentially, first a cladding layer, followed by H-PDLC layer, followed by masking and then by holographic polymerization to form the grating. Etching is then performed to form a ridge waveguide, followed by spincoating an upper cladding layer, and masking and depositing an upper electrode region formed by metallic or transparent conducting film.

In all the designs for integrated optical circuits to follow, a multiplicity of ESBGs are formed simultaneously simply by extending the above processes to masks representing the required number of ESBGs, with the additional possibility that different H-PDLC formulations, different grating periods and orientations may be applied to various individual elements within one substrate and thereby forming an integrated device with subelements of various individual properties. However, the inventions herein described are based on optical designs for optimum use of H-PDLC in ESBGs, and should not be considered to be limited or restricted by a particular fabrication process.

The following sections elaborate on the basic building block described above by describing functional devices that combine two or more waveguides, one or more of which may be associated with ESBGs.

Switchable Add/Drop Filter (SADF)

Figure 5A:
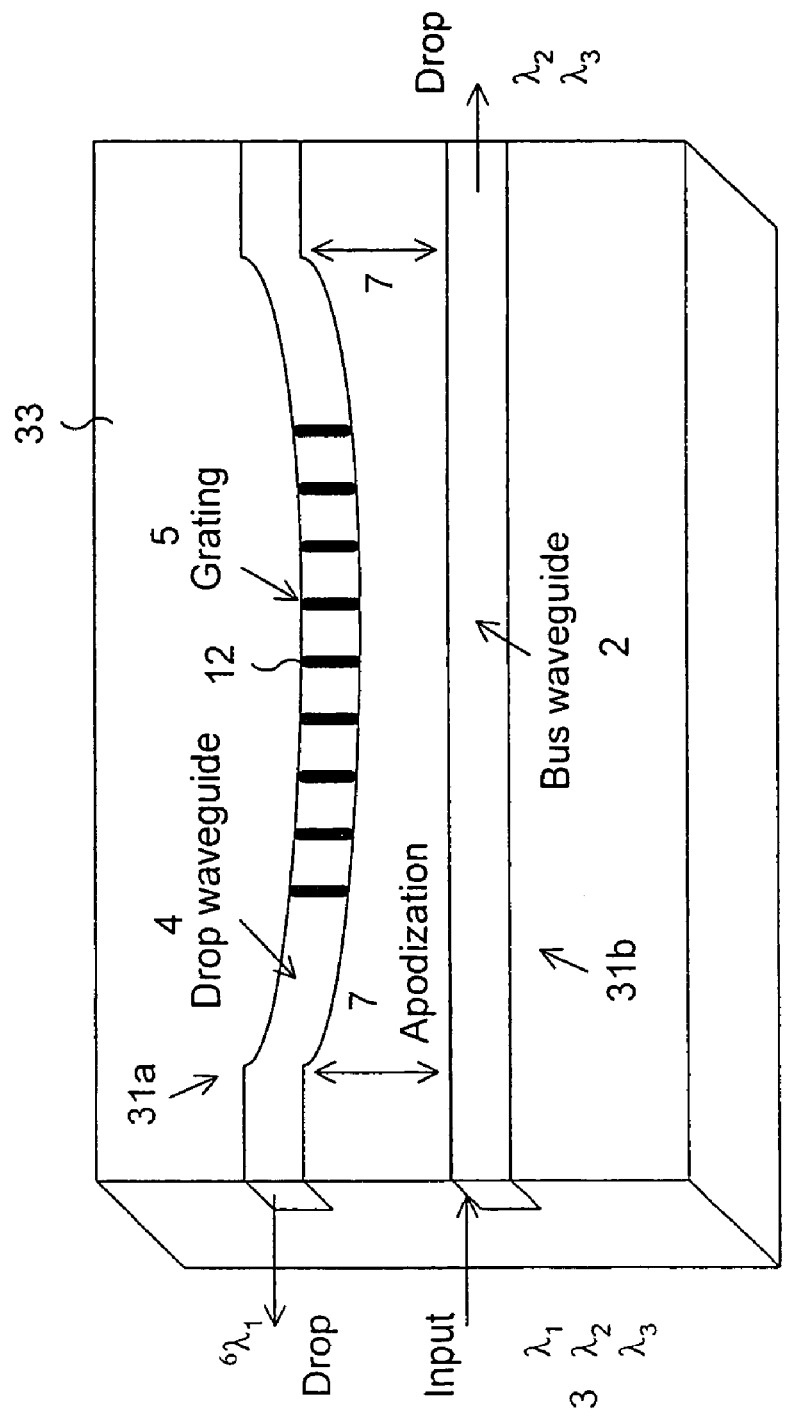
FIG. 5a is a schematic representation of a switchable add/drop single channel filter in accordance with the teachings of this invention.

FIG. 5a shows a preferred configuration for a switchable add/drop single channel filter. The basic functionality is to control the adding or dropping of a specified channel between for example an optical bus and a local or drop waveguide. The input signal (comprising a multiplicity of independent wavelength channels) propagates in the bus waveguide from left to right as drawn; the grating coupled drop channel is transferred to the counterprogagating direction (right to left as drawn) in the drop waveguide.

The bus waveguide and drop waveguide are nonidentical, (i.e., they differ in propagation constants) to the degree that no significant synchronous coupling will occur by mere proximity of the guides, unless via the mechanism of grating assisted coupling. This nonidenticality may have consequences for packaging the devices, in that butt coupling to single mode optical fibers will be relatively more efficient for one of the two waveguides than the other due to mode-matching considerations.

When the filter is switched out of the circuit by suppressing the spatial index modulation constituting the grating in the ESBG region, the component is transparent to all channels. Key performance criteria for telecommunications applications include large on/off ratio ≧35 dB, bandpass characteristics comparable to well-designed fiber gratings, including apodization for suppressed sidelobes, low polarization-dependent loss, switched-off insertion loss <0.3 dB for filtered and adjacent channels, and either zero power latchability or low power, low drift power-on state.

FIG. 5a illustrates a substrate 33 having a pair of waveguides 31a, 31b which are separated by distance which is more or less comparable to the width of the cores and within the evanescent regions of the waveguides. Thus, the evanescent regions of the two waveguides overlap. For purposes of illustration, an ESBG or grating is shown in or on the core of waveguide 31a; however, the ESBG could be in the core of either waveguide or in the evanescent region therebetween.

Figure 5B:
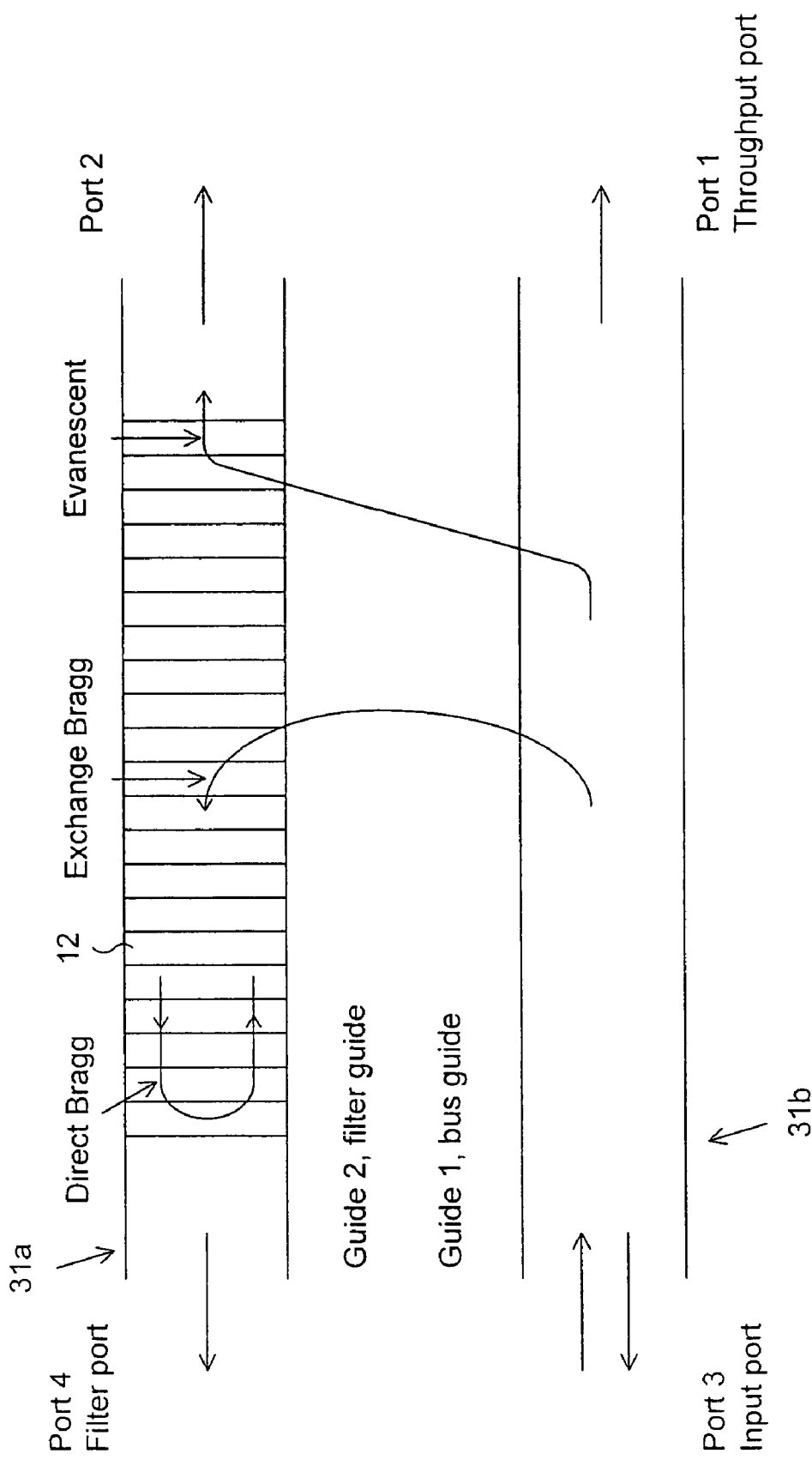

As shown schematically in FIG. 5b, there are a number of coupling mechanisms for light which, for purposes of illustration, is shown as entering at port 3 on the left side of waveguide 31b. In the absence of coupling at a wavelength contained in the input, the input signal or light appearing at port 3 will be transmitted through waveguide 31b and will exit through port 1 on the right hand side of this waveguide. By understanding and computationally evaluating various coupling mechanisms, the desirable channel add/drop process can be enhanced and undesirable couplings, which would not be affected by switching of the ESBG, can be minimized.

The second coupling mechanism is referred to as the exchange Bragg mechanism and will occur for a wavelength $\lambda_j$ determined by the period $\Lambda$ of the ESBG grating. In particular, the grating couples out wavelength channel $\lambda_j$ from the WDM signal on bus 31b and sends it in the opposite direction down waveguide 31a toward port 4. The grating period $\Lambda$ in order for an exchange Bragg coupling to occur for wavelength $\lambda_j$ is determined $$\Lambda = \frac{\lambda_j}{n_a + n_b} \quad \text{Eq. (4)}$$

where $n_a$ is the effective index of waveguide 31a and $n_b$ is the effective index of waveguide 31b. The effective index of a waveguide is the modal index of the waveguide based on the indexes of both its core and cladding regions and the modal field solution. The indexes for both waveguides are evaluated at $\lambda_j$. The bandwidth of the filter response is given by $$\Delta\lambda = \frac{2\lambda_j^2 \kappa}{\pi(n_a + n_b)} \quad \text{Eq. (5)}$$

where $\kappa$ is the coupling coefficient which can be determined using well-known methods of coupled mode approximation computations. $\kappa$ can be controlled by the grating index contrast and, in ESBGs, may be tuned electro-optically. Side lobe responses often occur outside the main channel bandwidth for exchange Bragg coupling. These can be suppressed by apodizing the grating coefficient $\kappa$ in a variety of ways. A simple way to apodize $\kappa$ is to increase the distance between the two waveguides away from the center of the device as shown in FIG. 5a, or in other words to curve the ESBG with the center closest to the bus waveguide and the ends further away.

In addition to the exchange Bragg coupling, there is also evanescent and direct Bragg coupling, both of which can interfere with and degrade the ideal spectral response. Evanescent coupling occurs when the modal indices of the two waveguides are substantially equal so that light passes between the two waveguides in a somewhat unregulated fashion, resulting in the drop wavelength, for example $\lambda1$ in FIG. 5a, also being output at port 2 in addition to port 4. $\lambda2$ and $\lambda3$ may also pass to port 2 as a result of this action. This coupling is undesirable because it would not be substantially altered by switching the ESBG, and therefore would contribute to crosstalk. As shown in FIG. 5b, direct Bragg reflections also degrade the ideal spectral response by causing some of the drop or exchange wavelength, for example $\lambda1$, to be reflected in waveguide 31a, for example as a result of the action of ESBG 12. Direct Bragg coupling can be quite large and cannot be eliminated completely. However, because it is a phase-matched process, one way to reduce its impact is to make the phase-matching wavelengths for the exchange Bragg and direct Bragg mechanism very different. This is accomplished by making the index values for each of the waveguides 31a, 31b different. In the spectral domain, both Bragg mechanisms lead to stop bands. An essential condition to assure that the coupling mechanisms do not strongly interfere is that the stop bands should not overlap in the wavelength domain. For this condition, $$|n_b - n_a| \geq |\Delta n| \quad \text{Eq. (6)}$$

where $\Delta n$ is the index contrast of the grating, this being the differences in the index spatially along the grating when the grating is powered. The larger the difference between the effective indices of the two waveguides, the less adverse effect direct Bragg will have on filter performance and the more ideal the filter or drop characteristics of the component will be to for example drop the desired wavelength from the signal on waveguide 31b with minimum loss as a result of the transfer. Fortuitously, since evanescent coupling is also caused by an index match between the waveguides, varying the effective index of the two waveguides also substantially eliminates evanescent coupling.

Thus, the maximum filter bandwidth depends on the index contrast $\Delta n$ of the ESBG and on the separation between the two filter waveguides. The bandwidth scales linearly with grating index contrast. For an ESBG spatial index modulation parameter of $\Delta n=0.01$, a typical value for index contrast, and a waveguide to waveguide separation of 1 micrometer, the bandwidth can be as large as 1 nm. This is sufficient for WDM applications. The bandwidth can be made larger by linearly chirping the grating period, or in other words by making slight spatial changes in the grating period.

For small enough wavelength, the ESBG grating can phase-match radiation modes and this leads to power loss. For the exchange-Bragg filters designed in accordance with the foregoing rule that the effective index of the two waveguides differ by at least $\Delta n$, the radiation-matching regions are those wavelengths which are 5 nm and smaller than the exchange Bragg center wavelength. For high index ESBGs with an index of about 1.53, these wavelengths would be displaced from the center wavelength by 50 nm. The degree of radiation loss can be minimized by putting the grating only on the filter waveguide, and making the filter waveguide higher index than the input bus waveguide.

Figure 5C:
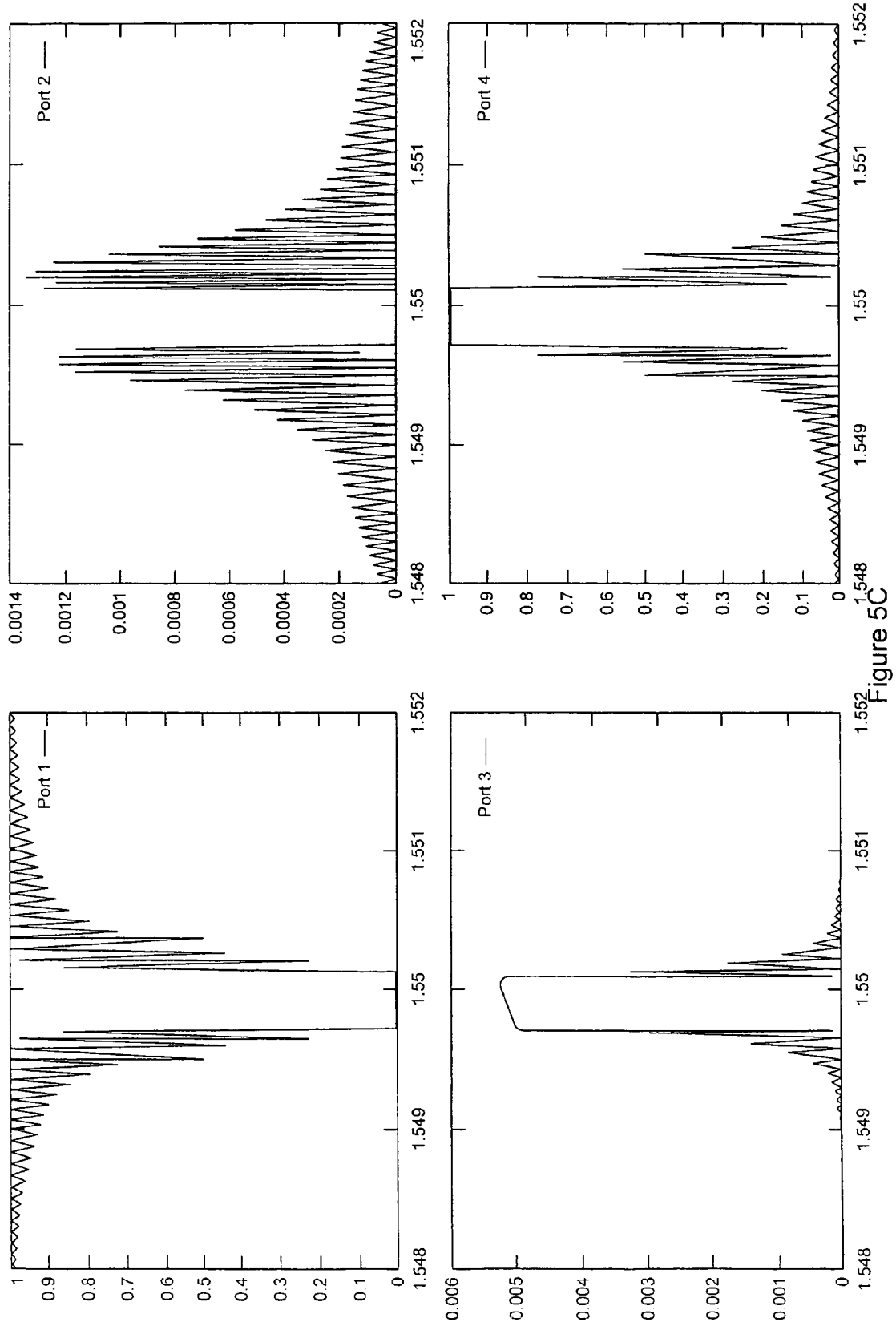
FIG. 5c are graphs illustrating optical performance at various ports for the filter of FIG. 5a without apodization and FIG. 5d are graphs of the performance at these port with apodization.
Figure 5D:
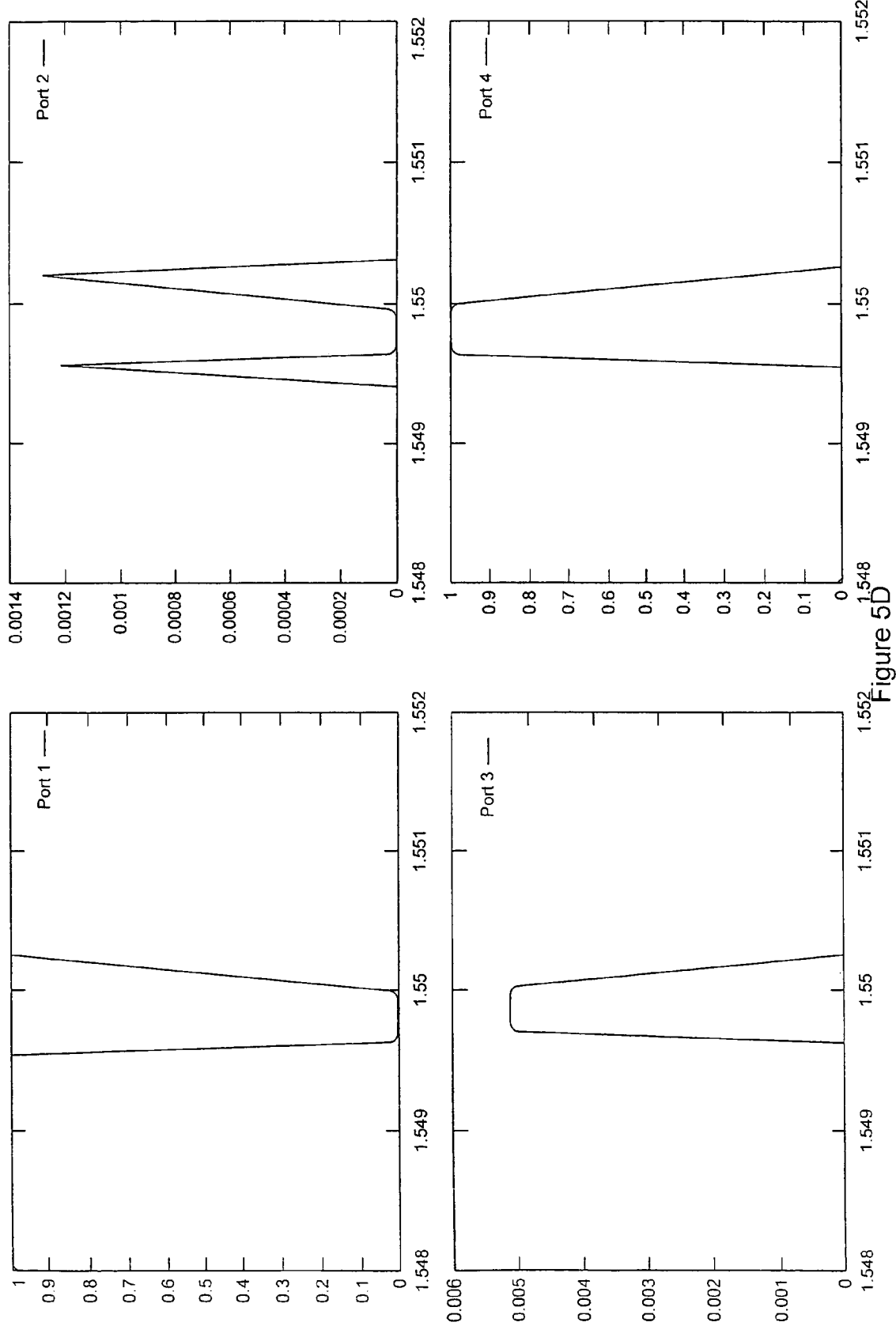

FIG. 5c shows the simulated optical performance using fabrication parameters as follows: bus waveguide width=8 $\mu$m, N=1.4492, drop waveguide width=4 $\mu$m, N=1.53, length=10 mm, grating period=523 nm, ESBG spatial index modulation=0.01, minimum guide separation=3 $\mu$m. Ports 1, 2, 3, 4 refer to the corresponding ports of FIG. 5b. In this example, no apodization was applied. In FIG. 5d, the benefits of apodization of the coupling by the curved interface between the waveguides are shown.

Based on modeling of this kind, the design shown in FIG. 5a has been found to have nearly optimum filter shape, with a box-like drop bandwidth and side lobes suppressed by apodization. Also, the device is not highly sensitive to length, as the spectral response shape remains similar if the length is increased to maximize the dropped power fraction. Drawbacks of such a filter are that a narrower bandwidth requires a longer device, which is not true of alternative, resonator-type designs to be disclosed below. Also, power is dropped in the oppositely propagating direction, and the design requires that the two waveguides by mismatched (i.e., that their propagation constants are substantially unequal).

Figure 5E:
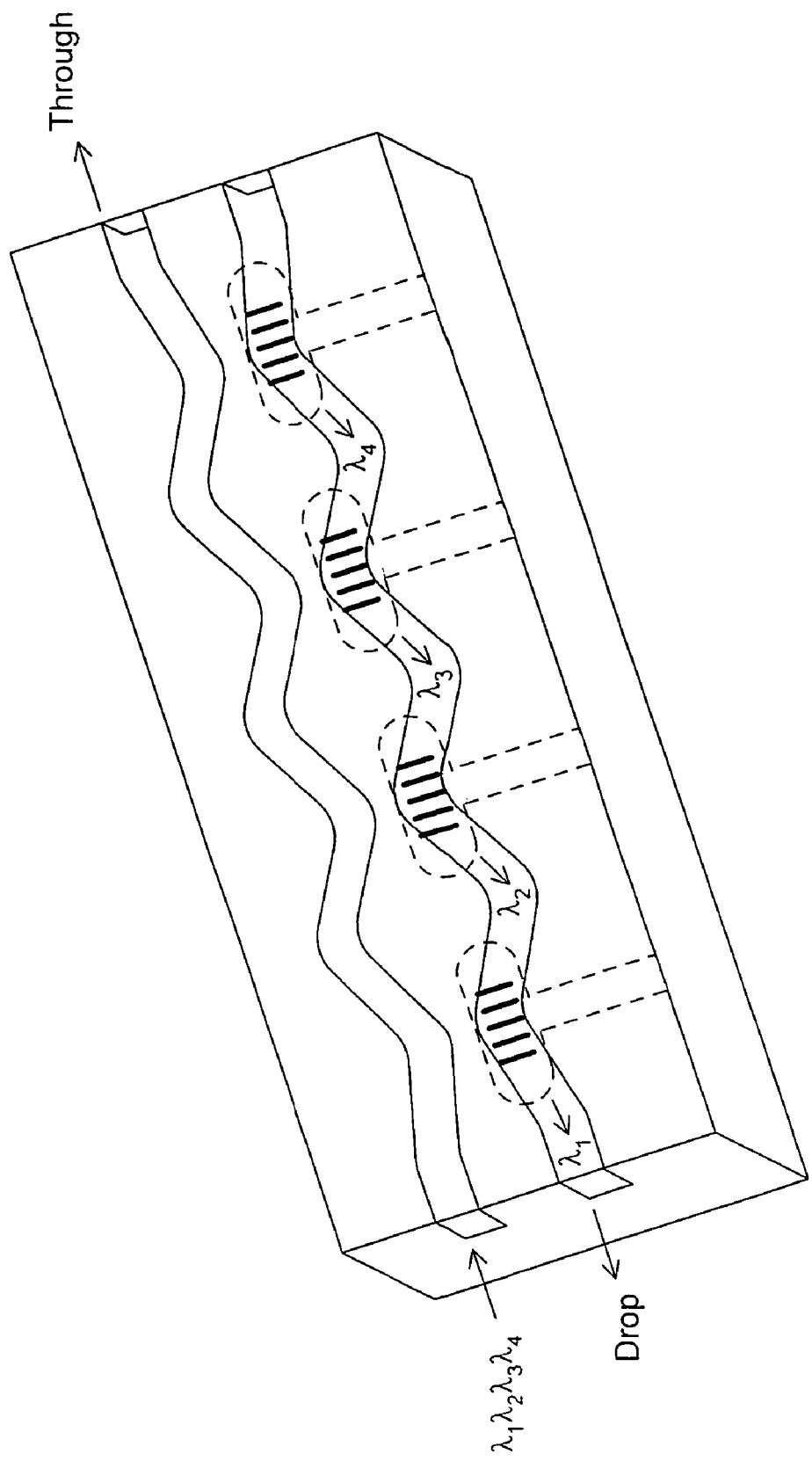

FIG. 5e shows an approach to integrated planar designs that extend the single element SADF to a four channel array that drops (or if used in the reversed direction, with inputs replaced by outputs and vice versa, adds) any of four wavelength channels, independently, into the drop port. Again, the bus and drop waveguides are nonidentical, limiting the practicality of this design for WSXC. In practice, limits to scalability depend on losses at each node, which accumulate as the array is extended to address a greater multiplicity of channels.

However, a practical problem with the two waveguides differing by Δn is that the core dimensions of the higher index waveguide must be made smaller than the diameter of an optical fiber in order for it to remain single mode. This causes coupling loss when butt coupling to fiber pigtails. For small index ESBGs (core index of 1.47, cladding index 1.444), the square core width is 4 micrometers and the resulting butt coupling loss can be about 20 percent. For large index ESBGs (core index 1.53, cladding index 1.444), the insertion loss can still be made a modest 30 percent if the core dimension is reduced to 1 micrometer. However, a 2 micrometer square core width in this case could give a 60 percent insertion loss, which would be unacceptable, and is therefore not utilized.

Figure 5F:
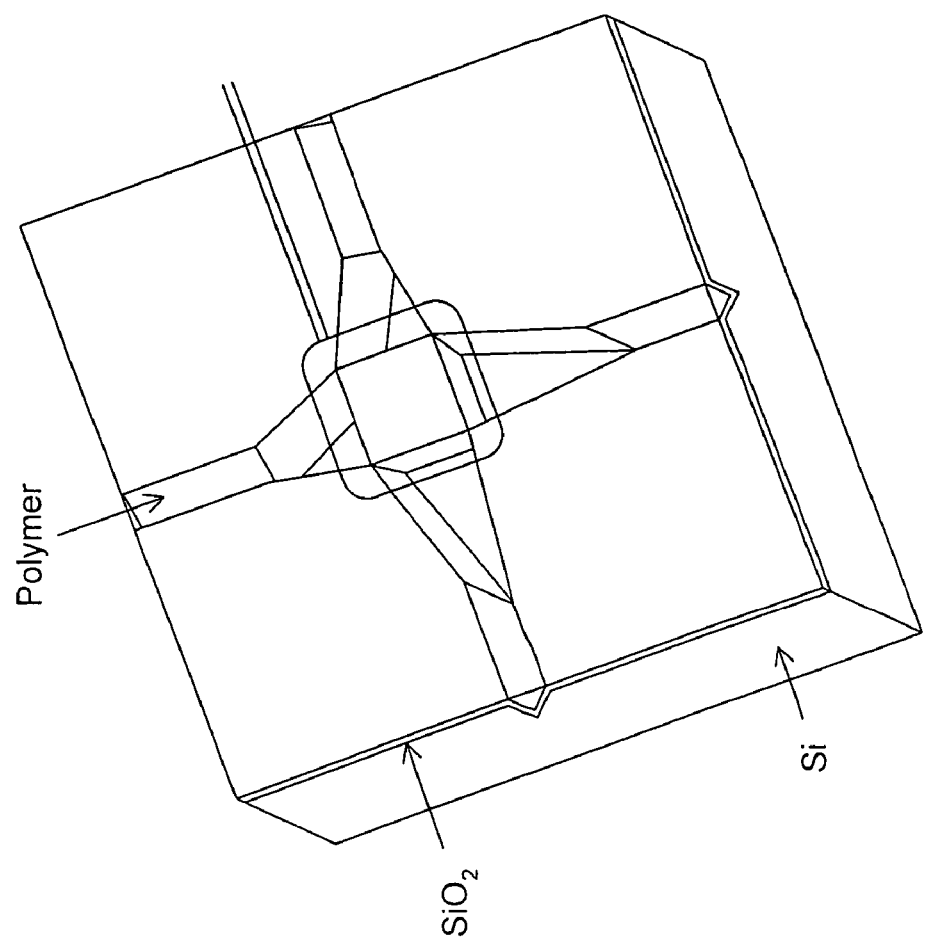
FIG. 5f is a schematic representation of an integrated optics crossconnect switch.

FIG. 5f illustrates a planar integrated 2×2 space switch which functions in a manner substantially the same as the 2×2 space switch shown in FIG. 21 and described in conjunction with this figure. FIG. 5f illustrates that such a switch may also be fabricated utilizing planar integration.

Wavelength Selective Crossconnect (WSXC)

The function of a WSXC is closely related to SADF, except it is configured to interconnect two or more optical buses instead of a bus distributed to a local node. In general, a WSXC selectively exchanges M-channel WDM signals among N×N incoming/outgoing optical fibers in order to dynamically reconfigure and route traffic within architectures that regard each wavelength as a separate and independent "virtual fiber." An N×N×M WSXC connects N fibers and M wavelengths. Future networks will rely on such a device in order for WDM to realize its full potential to multiply network capacity. Based on industry plan, devices ranging in scale from 2×2×4 up to 128×128×80 or larger may be required.

Several approaches to WXSC are being actively pursued in a number of laboratories; among these are INP integrated WDM routers combined with phase shifters or space switches, modular passive WGR routers coupled to thermo-optic or other switches, and acousto-optic filters. No leading technology has been established as yet, and most existing approaches are costly.

In accordance with this invention, a single switching point of a WXSC is a four port active switch with two input and two output ports. The switch is activated electro-optically, by the ESBG mechanism of toggling the periodic spatial index modulation constituting the grating for each selected element, on or off. By programming the control voltages for each ESBG element on a unified chip or substrate containing a multiplicity of such elements, a very large number of switching states may be realized for rerouting and reconfiguring the exchange of WDM signals.

Figure 6A:
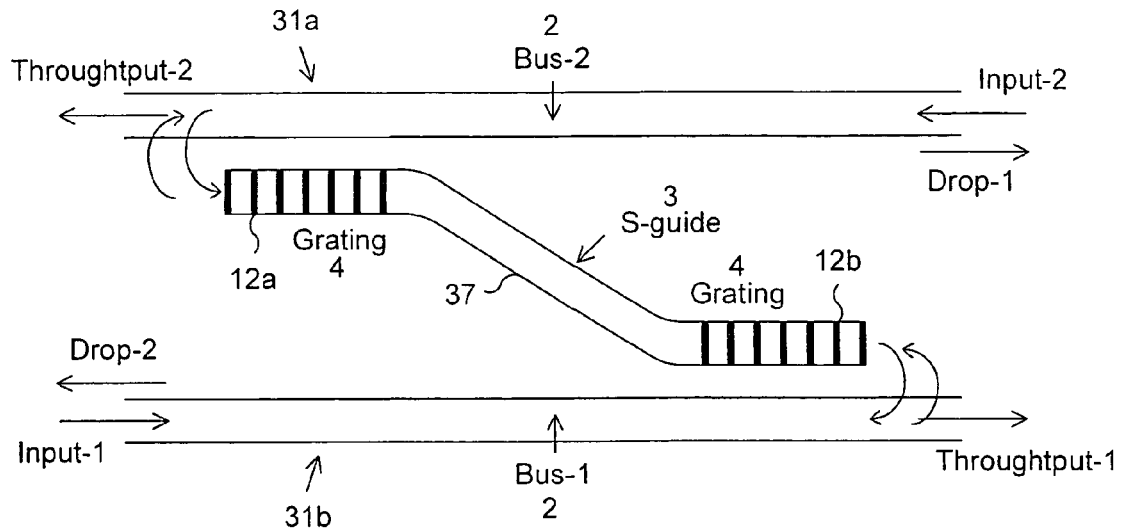
FIGS. 6a and 6b are schematic representations illustrating two embodiments for crosspoint switches in accordance with the teachings of this invention.
Figure 6B:
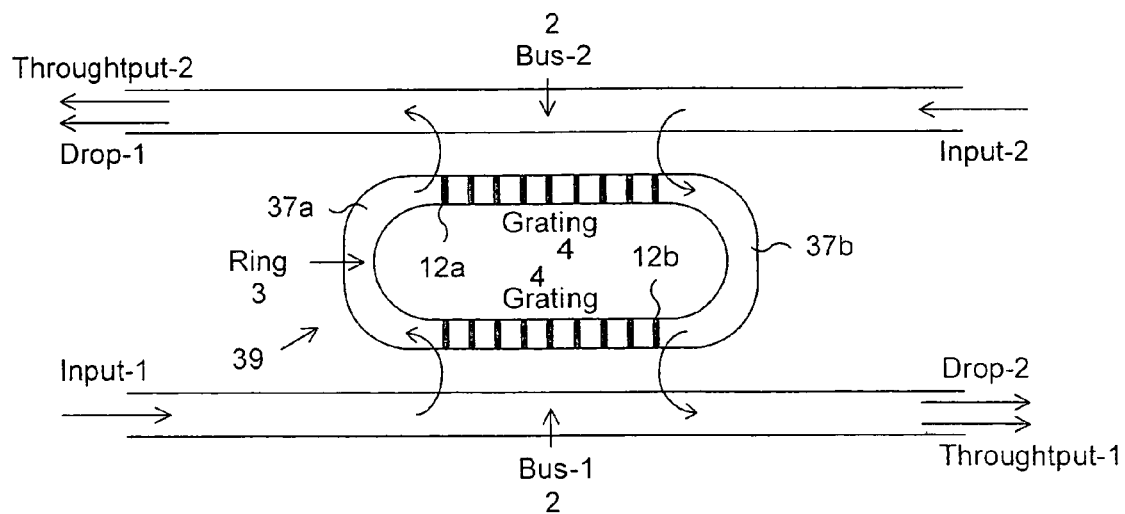

FIGS. 6a and 6b illustrate two variants of elementary cross-point switches based on ESBGs. Each of two main embodiments uses two ESBGs per element. The function of an individual element is to embody the elementary wavelength selective cross-point function. When the switch is not active, all wavelength channels at a particular input port will pass unaffected to a particular output port. When the switch is activated, a particular wavelength channel (if present) at each input port will be crossconnected to the alternate output port. All non-selected wavelengths remain unaffected.

In FIGS. 6a and 6b, unlike the earlier SADF devices, the two bus waveguides are identical (have equal propagation constants), and only the internal "s" or "ring" guides have substantially different propagation constants. Thus these also provide more efficient coupling to optical fibers.

Referring first to FIG. 6a, an ESBG 12a is in the evanescent region of waveguide 31a and a grating 12b is in the evanescent region of waveguide 31b. The waveguides are sufficiently separated so that their evanescent regions do not overlap. ESBGs 12a and 12b are connected by a curved or "s" waveguide 37. With this configuration, waveguides 31a and 31b may be of identical size and material and may have the same index, thus significantly simplifying fabrication and permitting standard couplings to be used for all waveguides so as to minimize insertion loss. However, undesired couplings (i.e. evanescent and direct Bragg couplings) are significantly suppressed by having waveguide 37 much smaller than the waveguides 31 so as to have an index differing from that of the waveguides 31 by an amount significantly in excess of Δn. The configuration of FIG. 6a thus provides superior suppression of undesired couplings and improve insertion loss performance, but is more complex and expensive than the configuration shown in FIG. 5a. While the gratings in FIG. 6a are not shown as apodized to reduce side-bands, this or other techniques could also be utilized with these embodiments for such side-band reduction.

FIG. 6b differs from FIG. 6a in that, instead of only a single waveguide 37 interconnecting ESBGs 12a and 12b, a pair of waveguides 37a, 37b are provided to perform this function, the ESBG 12 and waveguides 37 forming a closed ring 39. An advantage of the ring configuration of FIG. 6b over that shown in FIG. 6a is that, whereas with the configuration shown in FIG. 6a signals traveling between the waveguides 31 in either direction all travel through the same waveguide section 37, raising the potential for cross talk, in the configuration of FIG. 6b, signals from input 1 on waveguide 31b travel through waveguide segment 37a while signals from input 2 on waveguide 31a travel through waveguide segment 37b, reducing the potential for crosstalk. Another, perhaps more significant advantage, is that, whereas for the embodiment of FIG. 6a cross-connected and unaffected signals travel in opposite directions on a waveguide 31, for the embodiment of FIG. 6b all signals propagate in the same direction within any waveguide. The design of FIG. 6b, whereby the drop signals propagate parallel with the inputs, is considered to be more convenient for large scale integration, connectorization, and interfacing with the other elements of the optical network. The design of FIG. 6b is therefore the currently preferred design, although the design of FIG. 6a may be preferred for selected applications.

The configurations of FIGS. 6a, 6b are further advantageous in that, with two ESBGs at the coupling, wavelength selectivity can be enhanced in that each signal is doubly filtered. As a result, sidebands can be suppressed by up to 50 dB, which is not possible with a single ESBG.

Figure 7A:
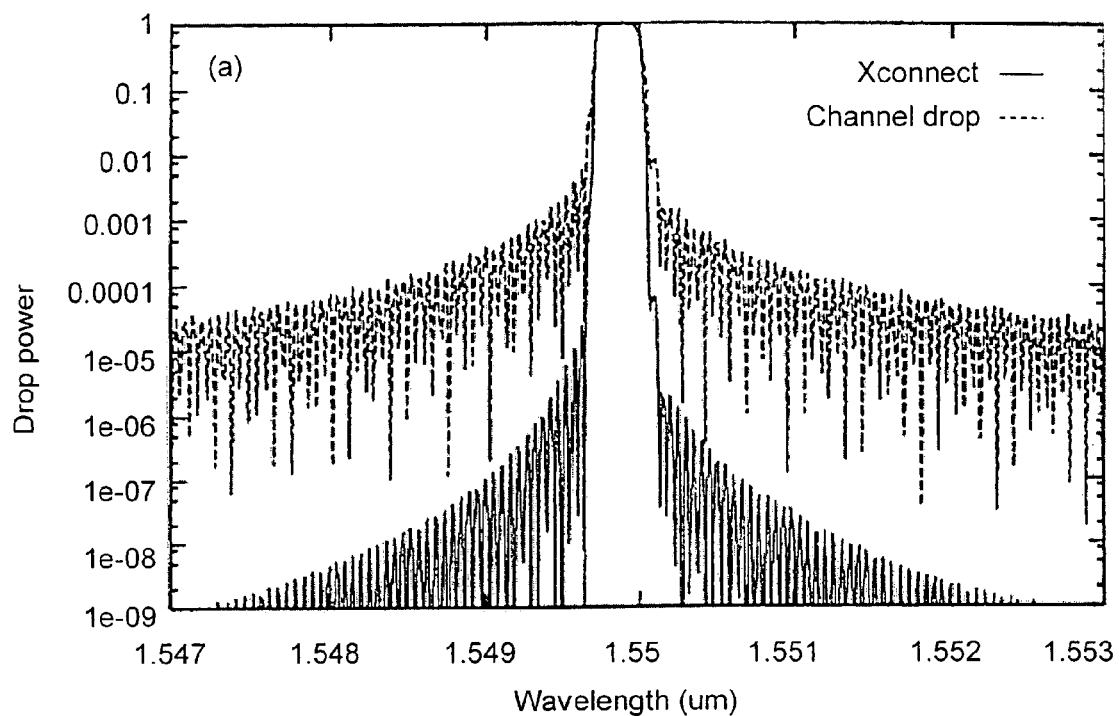
Figure 7B:
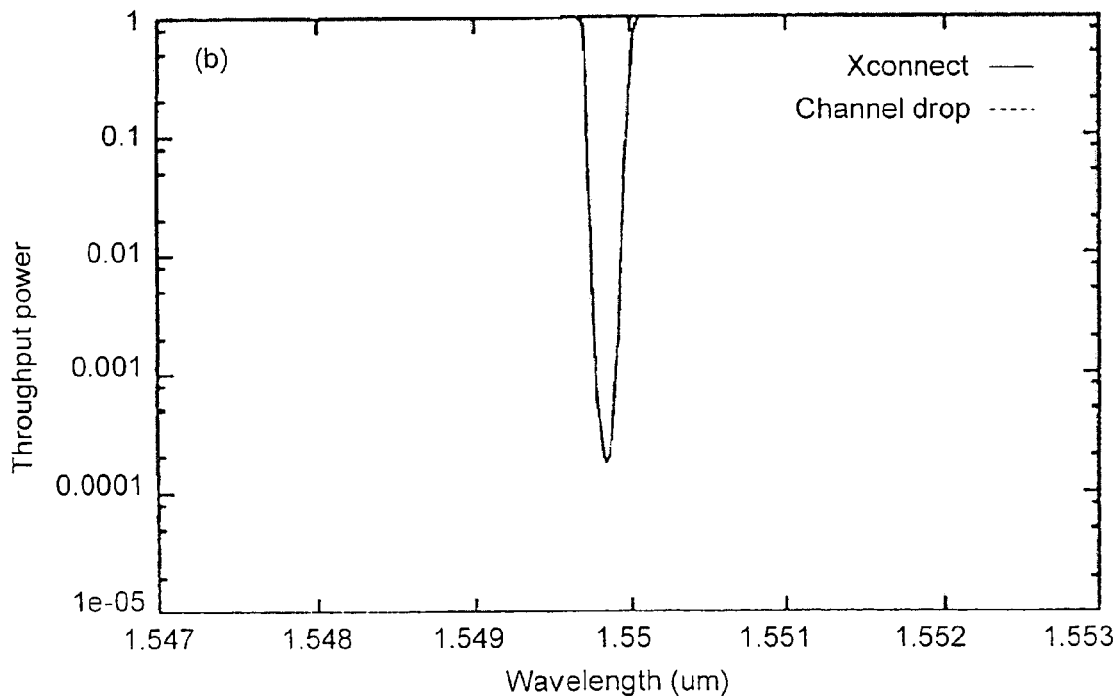

FIG. 7a compares the filter response of the S crossconnect (solid line) with a single exchange Bragg filter of the type shown in FIG. 5a (dashed line). (Here the S ESBGs have also been curved so as to effectively apodize the response.) The response of the S-crossconnect is virtually the squared response of the exchange Bragg filter. Thus the sidelobes are considerably reduced while the flat passband is preserved. FIG. 7b shows the details of the throughput response, where inband crosstalk can be less than −30 dB. In crossconnects it is vital to fully extract the dropped wavelength from the input bus, because a new signal at the same wavelength will be re-injected, and so-called inband crosstalk must be minimized. The inband crosstalk can be further improved by increasing the grating reflectivity, either by making the spatial index modulation of the ESBG larger, by raising the average index of the ESBG region or by making the ESBG longer. The freedom to adjust these parameters by the use of H-PDLC is another advantage of this material family for optimizing these designs.

Figure 7C:
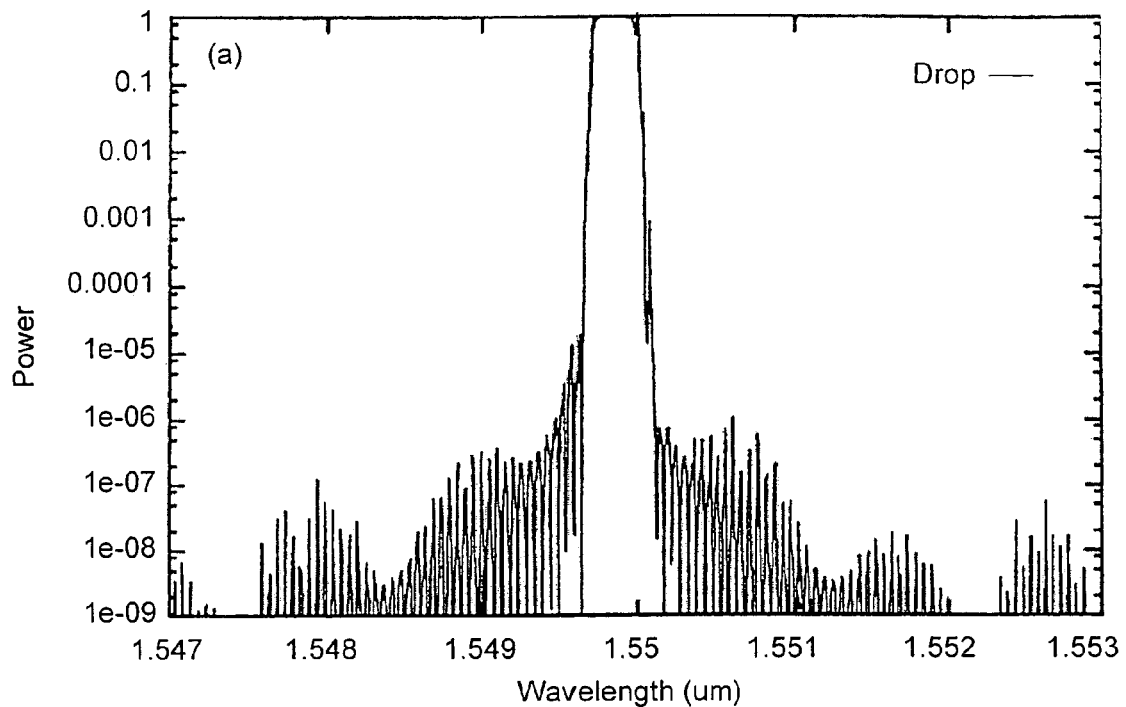
FIGS. 7c and 7d are graphs illustrating typical optical responses for the crossconnect shown in FIG. 6b.
Figure 7D:
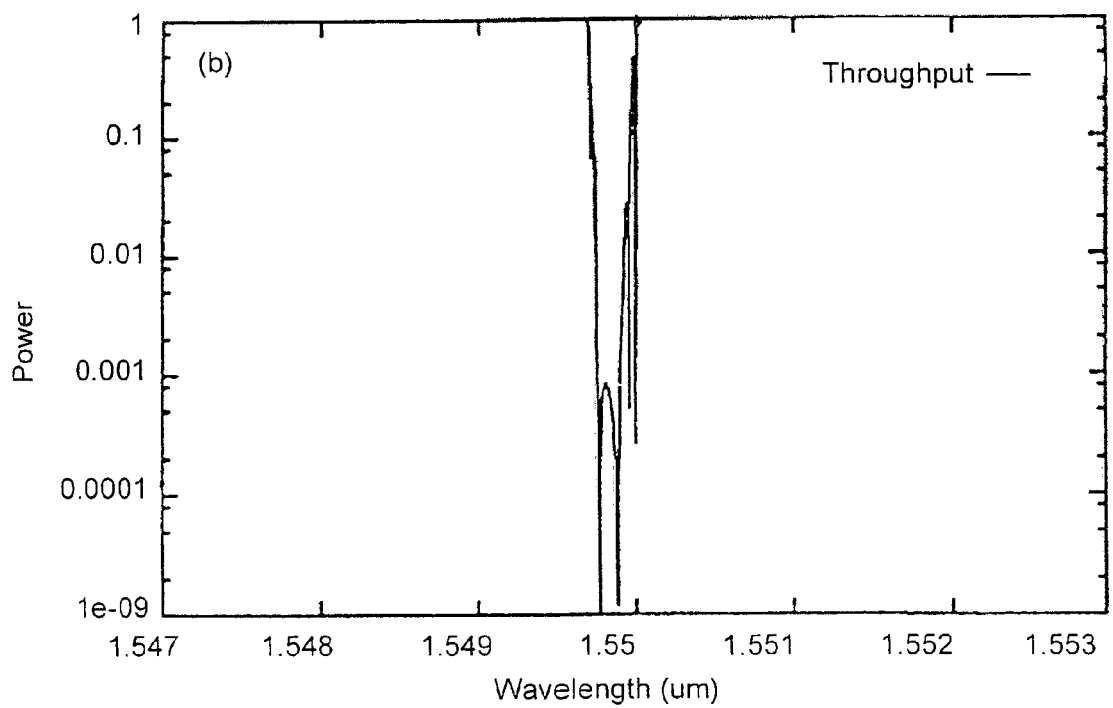

FIG. 7c shows a computed typical optical response of the ring crosspoint 39. This is similar to the S-crossconnect, except that spurious spikes are observed related to power trapping in the ring. In addition, the inband response is somewhat compromised because of the ring resonances. While the two ESBGs shown in the "s" form of FIG. 6a for the "ring" form of FIG. 6b could in principle be electrically controlled independently, it is intended in these designs that the ESBGs within each "s" or within each ring be electronically switched simultaneously and together in order to perform the described cross-connect function.

While the FIG. 5a configuration has been identified primarily as an SADF, and the FIGS. 6a, 6b configurations primarily as WSXC, in fact both could be used for SADF. From this point of view, for the components shown in FIGS. 5 and 6, the component of FIG. 5a is advantageous in that it can provide a box-like response, side lobes being easily reducible by apodization, that it is fairly length insensitive and that it is fairly simple and straight-forward to fabricate. However, since it required that the waveguides be mismatched in order to achieve useful performance, fabrication can become more difficult and there is a potential for insertion coupling loss problems. The embodiments of FIGS. 6a and 6b, while more complex, may be easier to fabricate since the waveguides 31 can be made of uniform size and undesired coupling modes are more easily and effectively suppressed. Where the device is being used only as a drop filter (i.e., a multichannel WDM signal on for example bus 31b, which may for example be a main transmission bus, has a single channel transferred to an appropriate local bus 31a), the configuration of FIG. 6a may be preferred. However, where the component is being used as both an add and drop filter, a WSXC or SADF (i.e., in addition to the channel being transferred from main bus 31b to local bus 31a, signals on bus 31a of the desired waveguide are also transferred through gratings 12 and waveguide 37 to bus 31b), the configuration of FIG. 6b may be preferred so as to minimize potential cross talk.

Figure 8A:
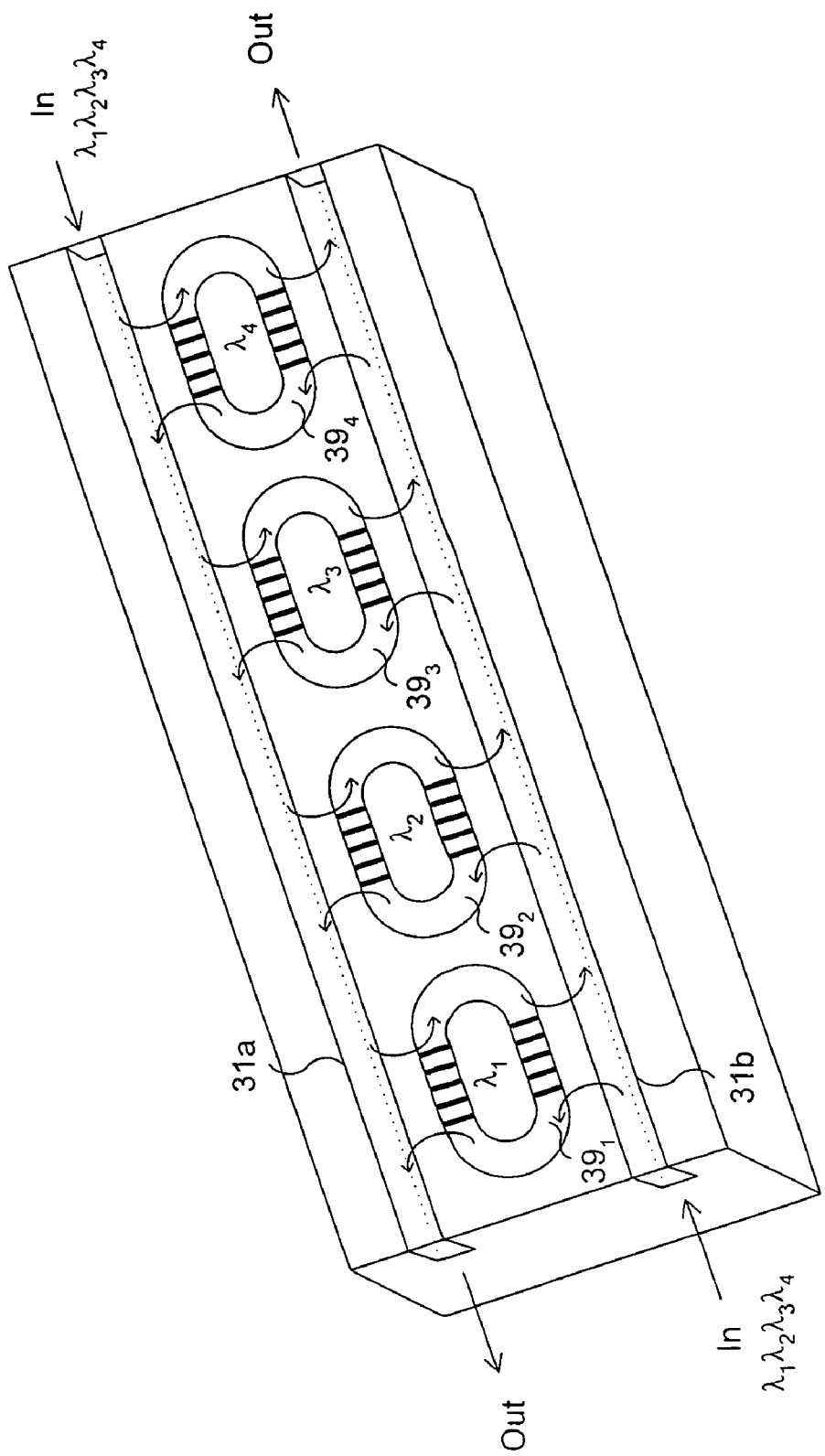
FIGS. 8a and 8b are schematic representations of illustrative crossconnect arrays between multiple waveguides for multiple wavelengths utilizing the crossconnect elements of FIG. 6b.
Figure 8B:
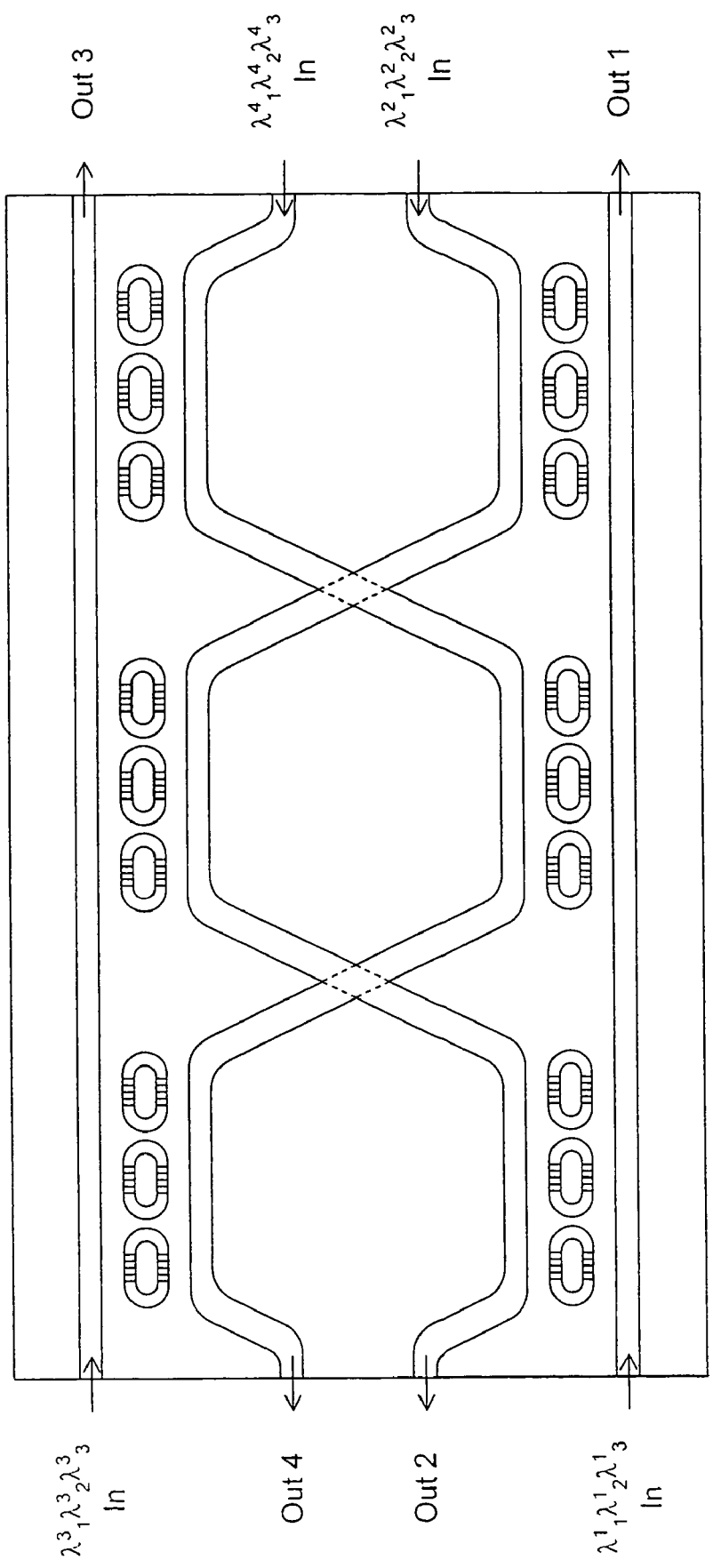

FIGS. 8a, and 8b are diagrams of illustrative crossconnect arrangements between multiple waveguides for multiple wavelengths. FIG. 8a for example shows two waveguides 31a, 31b each of which may carry four channels or wavelengths. At the junction of these two waveguides, four transfer rings $39_1$–$39_4$ are provided, which rings are each the same as the ring 39 shown in FIG. 6b, each of which rings has an ESBG grating period which causes the ring to perform the add/drop function for a specific corresponding wavelength channel 1–4. Thus, by selectively energizing one or more of the rings 39, information on selected channels may be added, dropped, or transferred between the waveguides 31. This is therefore a design for a two fiber in, two fiber out ESBG based WSXC, with four wavelengths (i.e., a 2×2×4 network). Rings $39_1$–$39_4$ could also be used to transfer between a main bus and local buses, each accepting a limited subset to the wavelengths on the main bus.

FIG. 8b shows a more complex network in the form of a Benesh net of six, 3-wavelength exchange sections connecting four input and four output waveguides, for what is sometimes referred to a 4×4×3 configuration. This embodiment functions in a way similar to that of the embodiment shown in FIG. 8a to permit the transfer of any of the four channels inputted on any of the four waveguides to be outputted on any of the four waveguides.

The network designs shown in FIGS. 8a–8b are merely illustrative of possible design options for constructing networks in accordance with the teachings of this invention and networks adapted for any number of input and output fibers and to any number of wavelength channels can be constructed using these or other network configurations, including the "s" form of FIG. 6a. The use of the Benesh net in FIG. 8b for the interconnections, which has the advantage of being rearrangably nonblocking, is know in the art as an efficient nonblocking architecture, but is by no means the only possible architecture offering this advantage, it being only one of the network architectures known to the art which might be applied for interconnecting such ESBG wavelength exchange regions into a multifiber network. A survey of network architectures may be found in H. S. Hinton, *An Introduction to Photonic Switching Fabrics*, Plenum Press, 1993.

Obviously, the complexity of the coupling increases as the number of waveguides and channels increases; however, networks employing the ESBG technology of this invention, including the illustrative network design do provide substantially scalability and, since, as will be discussed later, the entire device can be fabricated using fairly straight-forward integrated circuit technology, with the result that significant increases in the size and complexity of the network do not result in corresponding increases in cost. This is another significant advantage of the technology. Thus, the advantages of ESBG based add/drop and WSXC devices include on-chip intergratebility, polymer manufacturing capability and low-cost, single-step grating fabrication, coupled with high channel selectively, low cross talk and insertion loss and fast switching speeds, in the tens of microsecond range. Perhaps most important, the flexible chemistry and fabrication of ESBGs permits a number of differently optimized elements, differing in index, grating characteristics, period, orientation, and other parameters, to be fabricated together on a single substrate, which is difficult if not impossible to accomplish using any materials technology other tha H-PDLC.

Resonator Devices

Resonators are still another waveguide and grating configuration which may be utilized for implementation of SADF and WSXC element. Resonators are defined for purposes of this application as grating-based waveguide structures wherein storage of optical energy in a localized region is a significant principle of device function.

Resonator based wavelength filters have several characteristics that are superior to filters based on other mechanisms. These characteristics include the ability to synthesize arbitrary filter shapes by cascade-coupling numerous resonators and, unlike interference filters, the ability to control pass bandwidth by techniques other than changing device length. Resonators also do not have troublesome out-of-band side lobes. Instead, the out-of-band response decreases monotonically at a rate determined by the number of resonators comprising the channel drop filter.

Figure 9:
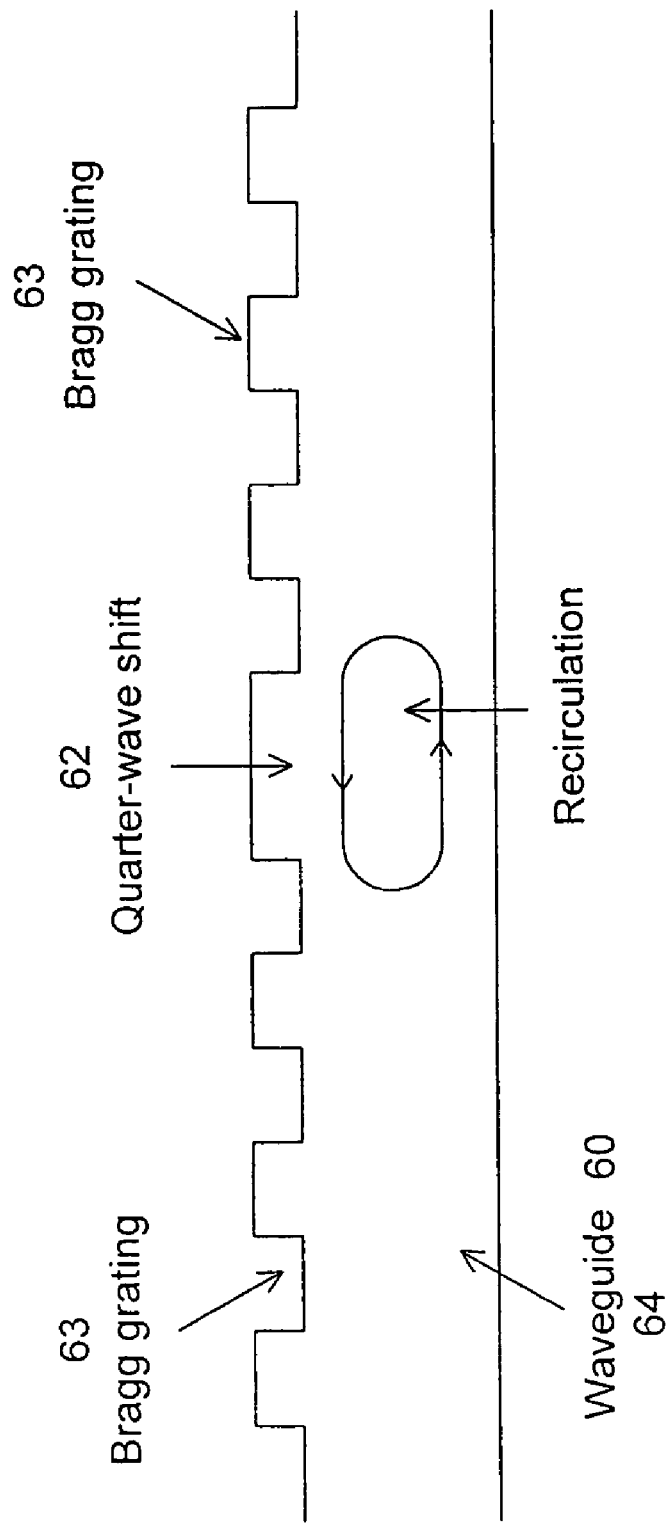
FIG. 9 is a schematic representation of an ESBG being used as part of a resonator.

Resonators can be realized by use of Bragg gratings incorporating a quarter waveshift, patterned on or near a wavelength, as depicted for the waveguide 60 in FIG. 9. The quarter waveshift 62 acts as a cavity while the gratings 63 to either side serve as distributed mirrors. The optical energy at a selected wavelength is trapped in the waveguide region 64 of the quarter waveshift section and circulates resonantly (wave 65). The period of the grating is determined by $$\Lambda = \frac{\lambda_j}{2n_e} \quad \text{Eq. (7)}$$

where $n_e$ is the effective index of the mode in the resonated waveguide evaluated at $\lambda_j$.

Figure 10A:
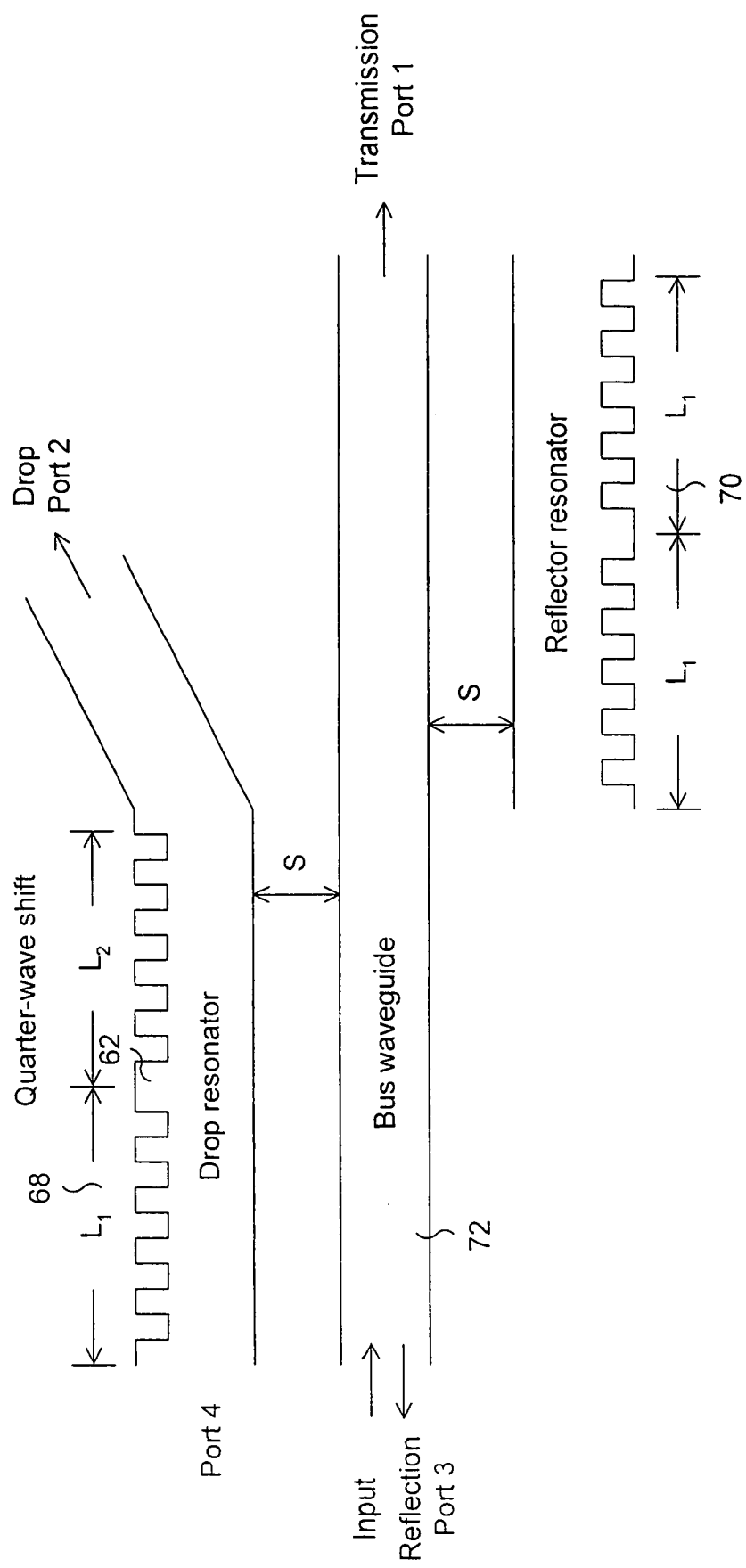
FIG. 10a is a schematic representation of a resonator embodiment for a channel drop filter.
Figure 10B:
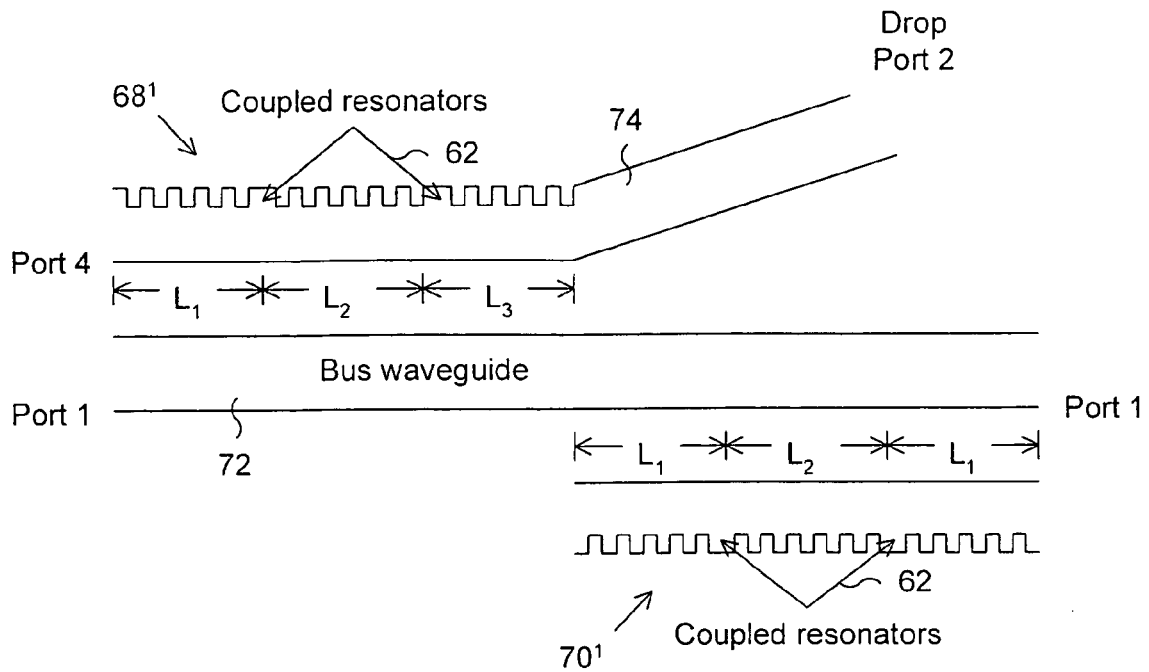
FIGS. 10b and 10c are examples of such filter employing higher order coupled resonators.
Figure 10C:
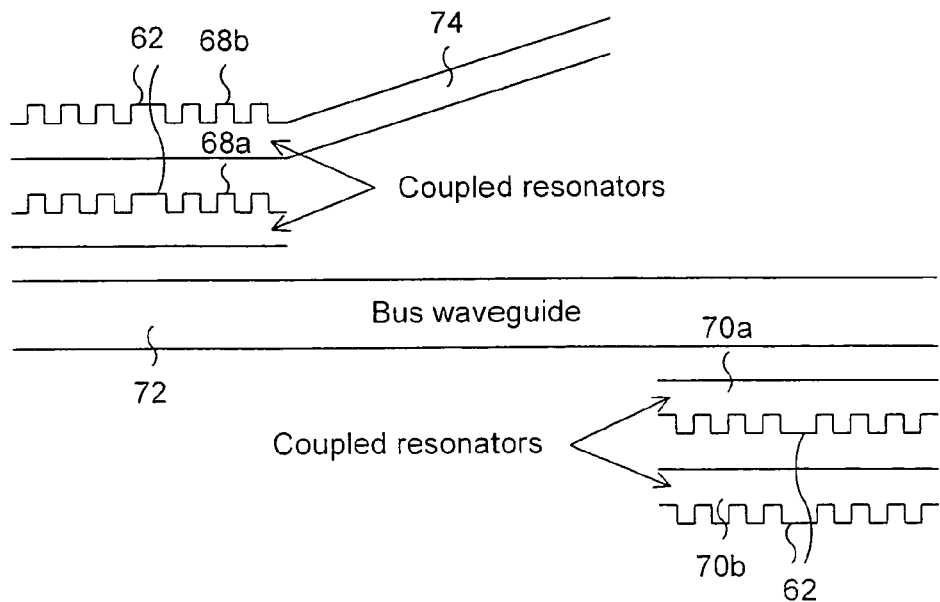

Wavelength selected channel dropping is accomplished by side coupling the resonator to one or more bus waveguides. There are several ways in which this may be accomplished, as depicted by FIGS. 10a–10c. In all case two resonators are required to get 100 percent extraction of the desired channel. This second resonator, which is referred to as the reflection resonator, is required in order to cancel the backward wave generated by the first resonator, which is referred to as the drop resonator.

In the resonator filter of FIG. 10a, the filter output drop, port 2, is directly coupled to the drop resonator 68. The reflector resonator 70 is coupled to the bus waveguide 72, but displaced spatially from the quarter-wavesection 62 of resonator 68 by an integer number of wavelengths, plus a half wavelength. While the filter output is dropped in the forward direction in FIG. 10a, it can also be dropped in the reverse direction by attaching the drop port 2 to the opposite end of drop resonator 68. The unterminated ends of the grating sections (port 4) must be made long enough so that no power escapes through them. Of multiple wavelengths inputted at port 3, one will be dropped to drop port 2 while the remaining wavelengths will pass unaffected to transmission port 1. The length of grating 68 and its index contrast between quarter-wavesection 62 and drop port 2, determines the bandwidth of the device.

In the structure of FIG. 10a and other resonator configurations, it is understood that the ESBGs constituting the several grating components are all to be switched on or off in concert, either by coordinating their respective electrode-applied signals, or by fabricating a single monolithic electrode over the entire resonator portion constituting multiple ESBGs.

Figure 10D:
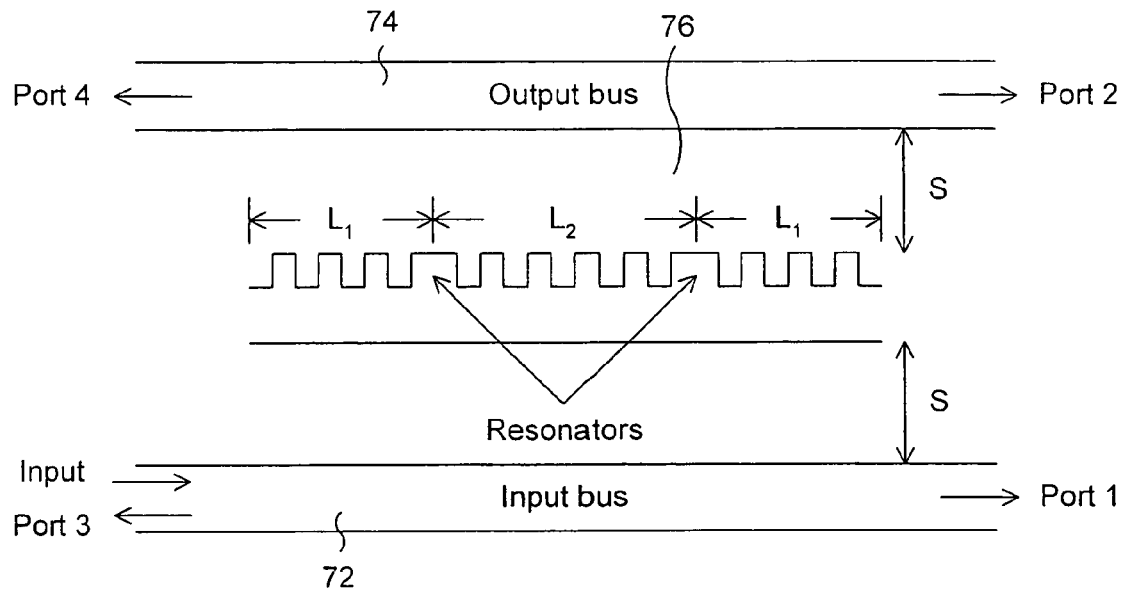
FIGS. 10d, 10e and 10f are schematic representations for three guide-channel dropping filters employing resonators in accordance with the teachings of this invention.

FIGS. 10b–10d are three examples of higher order filters which give improved filter performance by coupling multiple resonators. The channel drop filter in FIG. 10b is similar to that in FIG. 10a, a bus waveguide 72 being coupled to a series of drop resonators 68' and also to an identical series of reflector resonators 70'. Each resonator is coupled to its neighbors by a section of the corresponding grating. The length L2 of the connecting gratings between the quarter waveshifts 62 determines the details of the filter shape.

The channel drop filter of FIG. 10c has similar performance to that shown in FIG. 10b, differing from the filter shown in FIG. 10b in that the coupled drop resonators 68a, 68b and the coupled reflector resonators 70a, 70b are stacked adjacent to one another instead of being in series. This has the advantage of keeping the device length shorter. The distance between the portions of each coupled resonator determines the details of the filter shape.

While in the discussion above, the resonator waveguides 74 and the bus waveguides 72 have been matched, this is not a requirement. The main difficulty in using mismatched guides is that the power transfer efficiency from the input bus to the resonator decreases, the effect being similar to a synchronous directional coupler. Thus, it is generally more difficult to realize large linewidths unless the bus and resonator waveguides are very strongly coupled and/or the grating index contrast is large. In addition, because the modes walk-off in space due to the difference in propagation constants, higher order filters can only be realized by series coupled resonators as depicted in FIG. 10c. However, such devices may be preferable for ESBGs utilizing relatively high index composites, making it desirable to fiber match the bus waveguides.

Figure 10E:
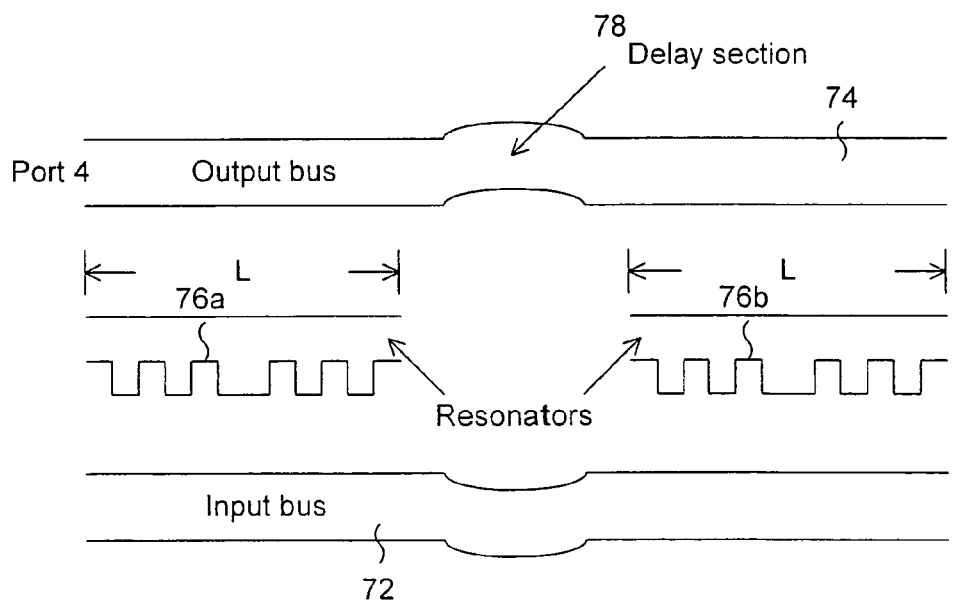
Figure 10F:
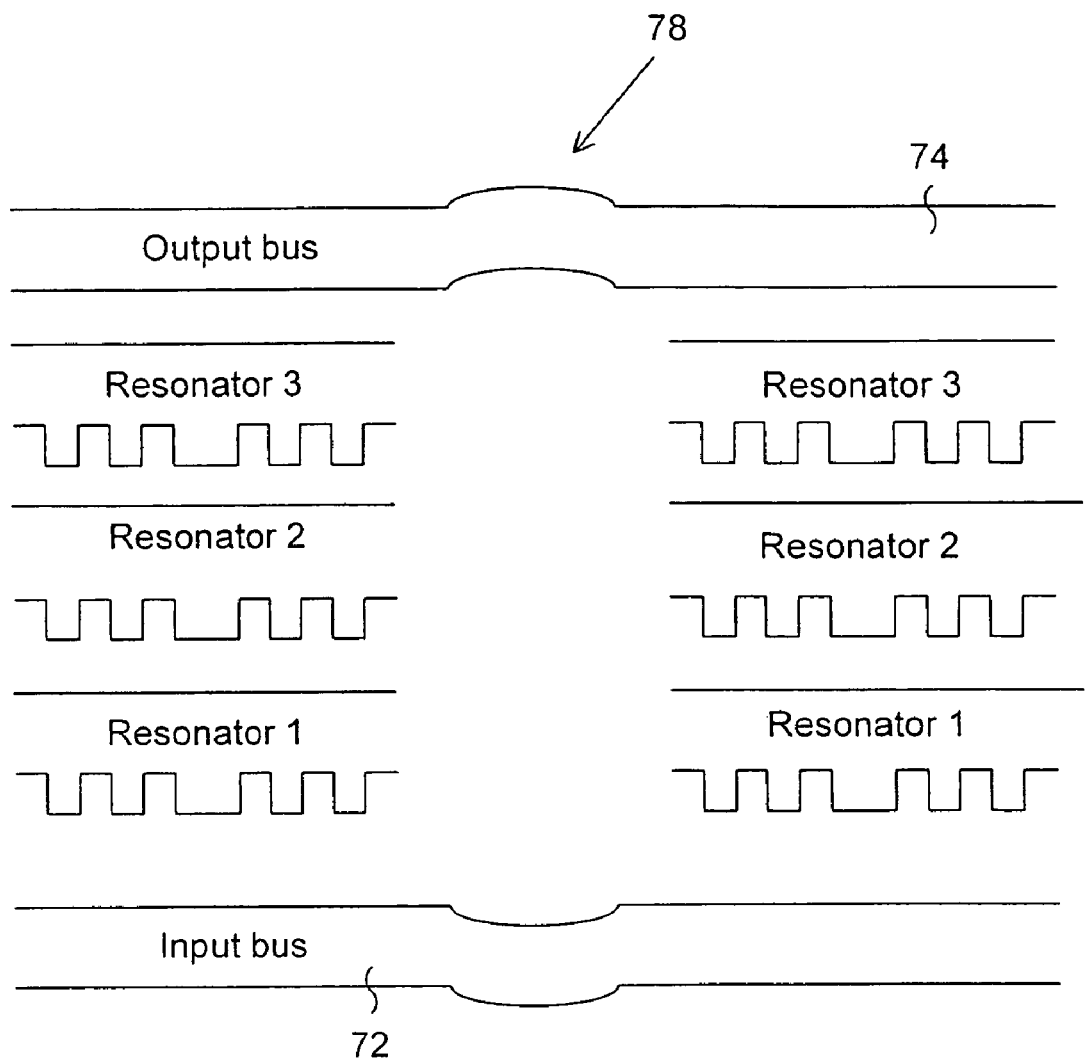

Three guide-channel dropping filters are schematically illustrated in FIGS. 10d–10f. In these embodiments, the resonator is side-coupled to both an input and an output bus (i.e., the resonator is in the cladding between the buses, which claddings overlap). For channel dropping filter embodiments of such resonators, two resonators are still required. The primary advantage of the configurations shown in FIGS. 10d–10f is that the resonator is independent of the input or output waveguides. In addition, for the embodiments of FIGS. 10e and 10f, the waveguide separation S and the resonator lengths L are independent design parameters, unlike the situation for the two-guide structure where these parameters are related. In FIG. 10d, the two resonators are coupled together. When the lengths of all grating sections are appropriately chosen, power is dropped into port 2 at resonance. In the embodiment of FIG. 10e, the two resonators are de-coupled. However, a phase delay section 78 must be introduced between each resonator along the bus waveguides. This phase delay may be realized by making the input and output bus waveguides different in length or by changing the waveguide dimensions to modify the propagation constants. For matched waveguides, the phase delay of the input bus must amount to $\pm\pi/2$, while the delay of the output bus must amount to $\mp\pi/2$. For this embodiment, power is dropped to port 4 at resonance. This embodiment is less restrictive than the one appearing in FIG. 10d, because the resonator lengths, and the bus-to-resonator separation, are independent design parameters.

Stated another way, FIG. 10e shows a resonator channel dropping filter using unperturbed waveguides 72, 74 with a split resonator 76a, 76b placed between them. The split resonator is required in order to achieve full signal extraction. The advantage of this configuration is that the input and the filtered bus waveguides can be optimized for in/out fiber coupling, while the resonators can be independently optimized to achieve low loss and other advantages. Phase delay section 78 must be inserted along the bus waveguides in between the two resonators. The phase delay between quarter-wavesections of each resonator must amount to $\pm\pi/2$ in the input bus 72 and $\mp\pi/2$ in the output bus 74. In either case, multiples of $2\pi$ phase may be added to the waveguide delays without affecting the performance.

The channel drop filter of FIG. 10f is similar to that shown in FIG. 10e except that multiple parallel-coupled resonators are provided between the buses as for the embodiment of FIG. 10c. The multiple coupled resonators could also be connected in series as in FIG. 10b rather than in parallel. As for the embodiment of FIG. 10e, delay sections 78 are required. What has been said for previous embodiments concerning multiple resonators connected either in series or in parallel applies also for the embodiment of FIG. 10f.

Figure 11:
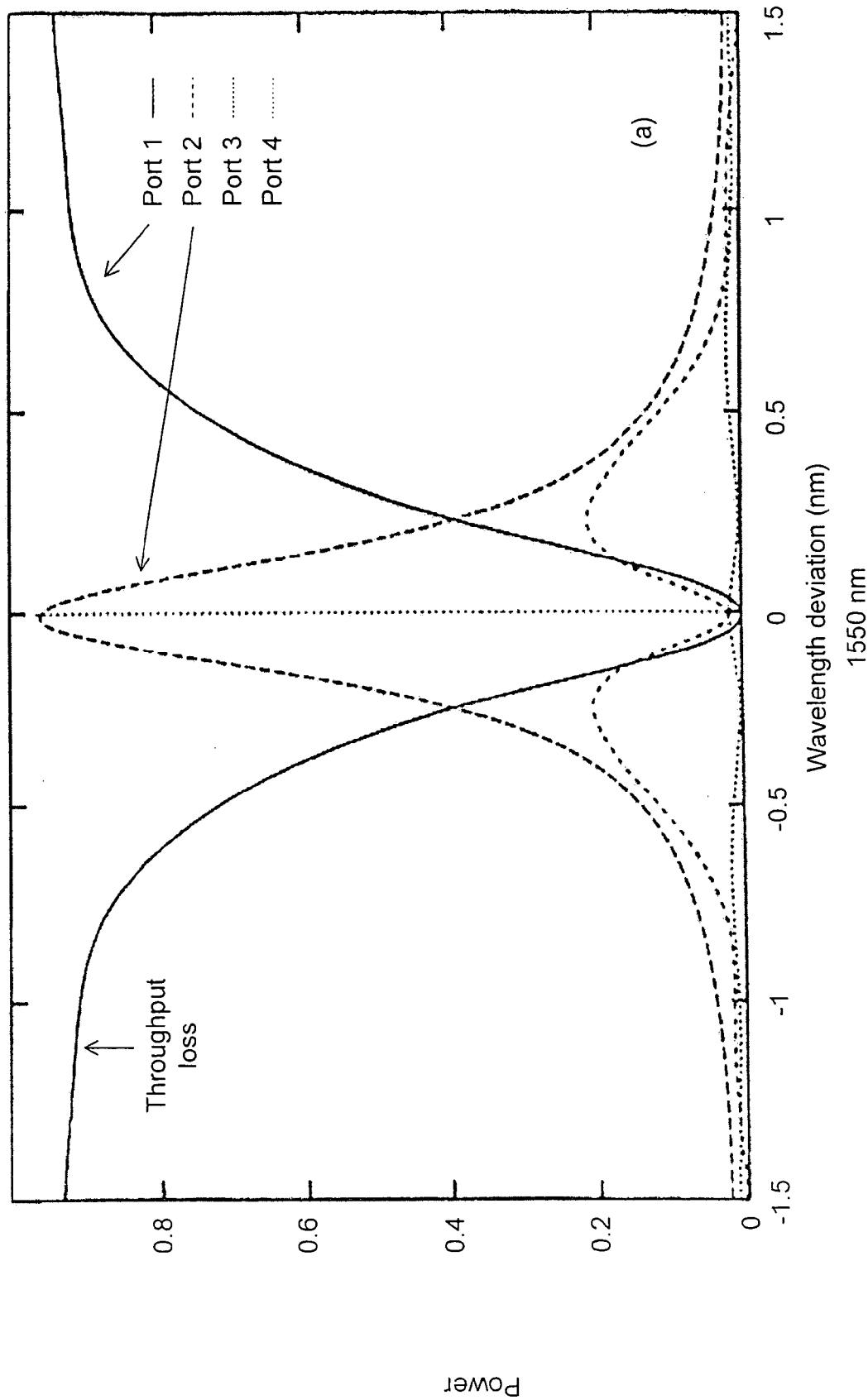

FIG. 11 shows one example of the response, in this case from a matched bus/resonator, for the power out of the various ports as a function of deviation from channel center wavelength.

Planar Integration

In order to integrate a number of different elements of the above-described categories on a single substrate, it is desirable to employ structures based on planar-waveguide based integration, as previously discussed and as will be illustrated for a more complex structure in FIGS. 12a–12e and 13a–13b. One path to such integration relies on an extension of the fabrication process described earlier, wherein using silicon micro-optical bench technology, waveguides are comprised of regions of high index (doped silica or polymer) deposited in pure silica claddings which in turn are processed in etched silicon substrates manufactured by well established methods of the microelectronics industry.

Thus one path of multidevice integration is to extend such fabrication to more complex networks of devices and elements. FIGS. 12a–12e show a straightforward extension of the fabrication method to encompass combinations of disparate devices. The waveguide structures 48 is first manufactured. ITO or other electrodes 20 are deposited where required (FIG. 12a). Then a H-PDLC film 30 is applied to the structure by spincoating or other polymer coating techniques (FIG. 12b). A binary phase mask 52 is then put in place which contains pre-designed grating parameters in order to produce the various periods and directions of the required gratings, to perform the differing functions described (FIG. 12c). FIG. 12d shows the cover plate (for example glass or silica) with the upper electrodes formed thereon being mounted to the substrate, and FIG. 12e shows the final assembly.

Figures 13A, 13B:
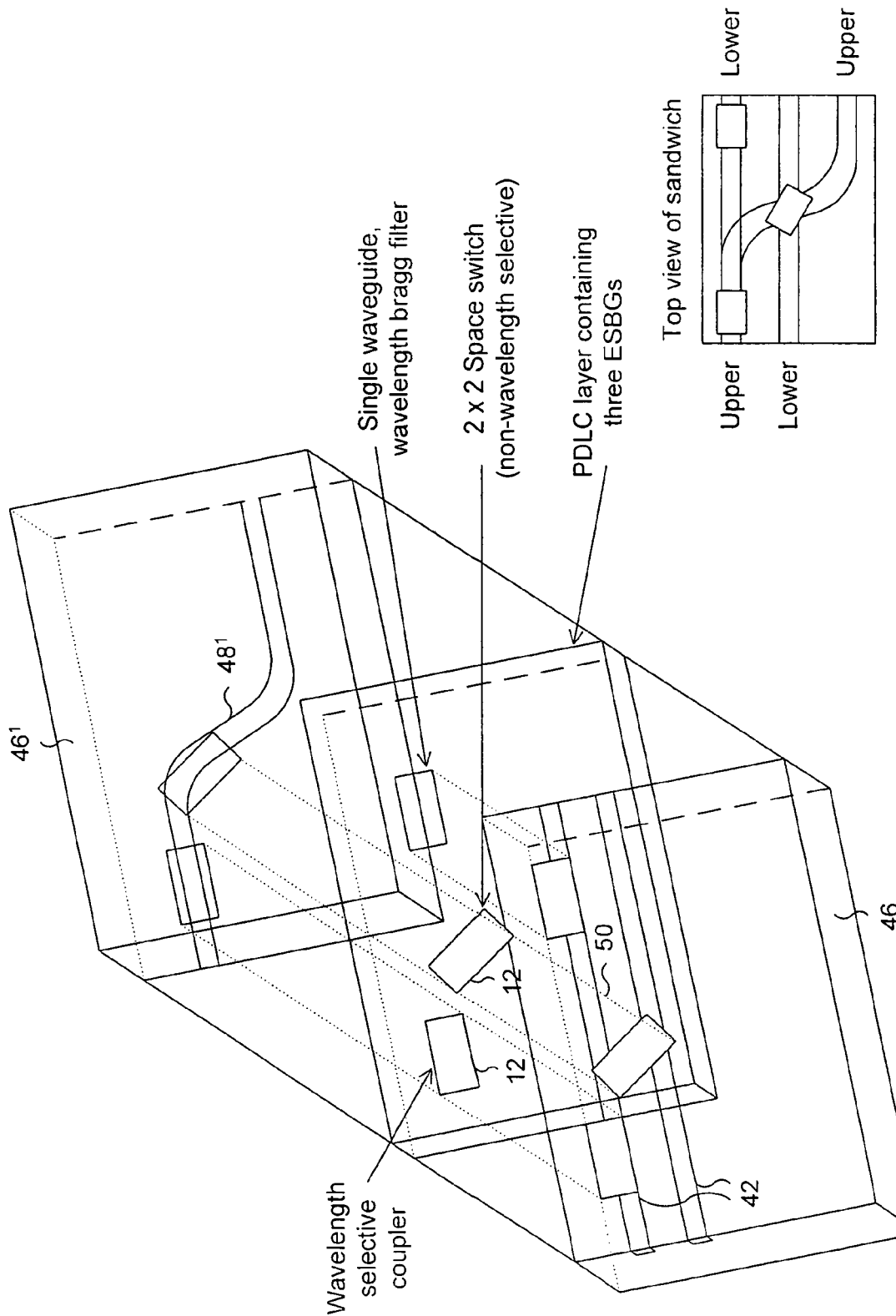
FIGS. 13a and 13b illustrate an alternative fabrication technique for integrated arrays in accordance with the teachings of this invention.

A different path to multidevice integration is disclosed in FIGS. 13a–13b. As discussed earlier, ESBGs may be located in either the core or cladding regions of planar waveguides. Although generally the core location results in stronger interactions and better performance, some advantages apply to cladding located ESBGs, which may also be termed "overlay" ESBGs in that the grating films overlay a structure of underlying waveguides.

In particular, overlay ESBGs open the possibility for a large scale integration technology in which a monolithic ESBG film is sandwiched between an upper network of waveguides and a lower network of waveguides. The overlay approach can be transferred to an integrated planar waveguide technology by the sandwich technique illustrated in FIGS. 13a and 13b. The lower layer 46 is a silicon based structure containing many silica based or polymer waveguides 48 in a network that approach the surface in selected interaction regions. A matching upper silicon layer 46' contains a second network of waveguides 48'. The design is such that the waveguides from the upper plane contact or cross or coincide with the waveguides from the lower plane at selected loci or nodes 50, and otherwise are fully clad so as to protect low loss propagation.

Where waveguides from the upper section have exposed evanescent regions crossing exposed waveguides from the lower section at a substantial angle between the two, an ESBG film 12 placed between them can couple them in the 2×2 space switch 44 to be described later using fiber based devices, the principle being the same. Either one of the substrates may have the H-PDLC film formed thereon, with the ESBG gratings formed therein in manners discussed elsewhere, or an H-PDLC film with ESBGs formed therein, or floated ESBG decals, may be mounted between the substrates. Electrodes are preferably formed on the substrates at each node.

Where waveguides from the upper section have exposed evanescent regions crossing exposed waveguides from the lower section in a parallel path, an ESBG film placed in one of the waveguides or between them as previously described to implement SADF, WSXC, other couplers or other devices described earlier, provided that the upper and lower waveguides are identical or nonidentical in the coupling region, as required, which may be implemented by well known methods of channel waveguide design.

By combining such individual devices into networks, an unlimited variety of integrated device architectures can be fabricated in which the individual switching, path-exchange, and wavelength selective properties can be combined and permuted in many architectures.

Finally, the waveguide to free space principle described later can be implemented provided there are holes in the silicon layers for light to be coupled in free space out of or into the waveguides. This could be used to provide inter-plane communication, in order to extend the sandwich structure into multiple layers.

Single Step Holographic Exposure of Multiple and Diverse Overlay Nodes

In a planar integration geometry as described, the middle of the sandwich is a collection of overlay ESBG films comprising the various individual gratings, with different orientations and periods (grating vectors) but with a common layer thickness. An efficient one step manufacturing process will result if all such gratings required for the multiple functions of the various nodes are made simultaneously.

A binary phase mask, well known to optical science, will produce two beams when side-illuminated by a single laser beam (this being the H-PDLC exposing beam, typically 488 nm). These two beams then cross in close proximity to the polymer film, producing ESBGs. After exposure, the finished lower (or upper) plane with ESBG active films in place is removed from the fixture containing the binary multi-mask. Thus one step of holographically exposure will simultaneously produce a number, possibly hundreds, of device nodes on a single planar chip, several of which may have differing characteristics from the others, which device nodes may be of a single type or may be of a variety of different types. After stabilization, the two halves are combined and finally packaged.

Coupler-half Devices

A device also suitable for practicing the teachings of the invention, which device has been known to the art of fiber optics since the early 1980s, is the polished coupler or coupler-half (also known as a side polished fiber). A single mode optical fiber is bent on a long radius (such as 15–50 cm more or less) and cemented into a groove in a silica block, which is used to hold and support it while the fiber is polished to expose an oval region of cladding close to the core. The function of the glass block is primarily to hold the fiber, but it also provides a smooth flat surface coinciding with the polished fiber facet. With a deep enough polish depth (for example, to within 2 $\mu$m of an 8 $\mu$m diameter core), substantial intensity of the evanescent optical field becomes accessible. As is commonly practiced, such coupler-half devices can be used as a variable splitting ratio coupler by mating their polished surfaces. Also, coupler-halves have been used as substrates to couple single mode fibers into metallic, polymer or liquid crystal films for the purpose of making fiber optic polarizers, spectral filters, and other components.

In accordance with the teachings of this invention, coupler-halves may also be used for low cost and efficient coupling of single mode optical fibers to overlay type ESBG films, which are easily deposited and supported on the polished surface, or to certain other types of film, for example thermo-optic film. Devices based on optical fibers are simple to make and, unlike planar waveguide structures, automatically offer easy coupling into and out of the optical fibers and connection to other fibers.

Figures 14A, 14B:
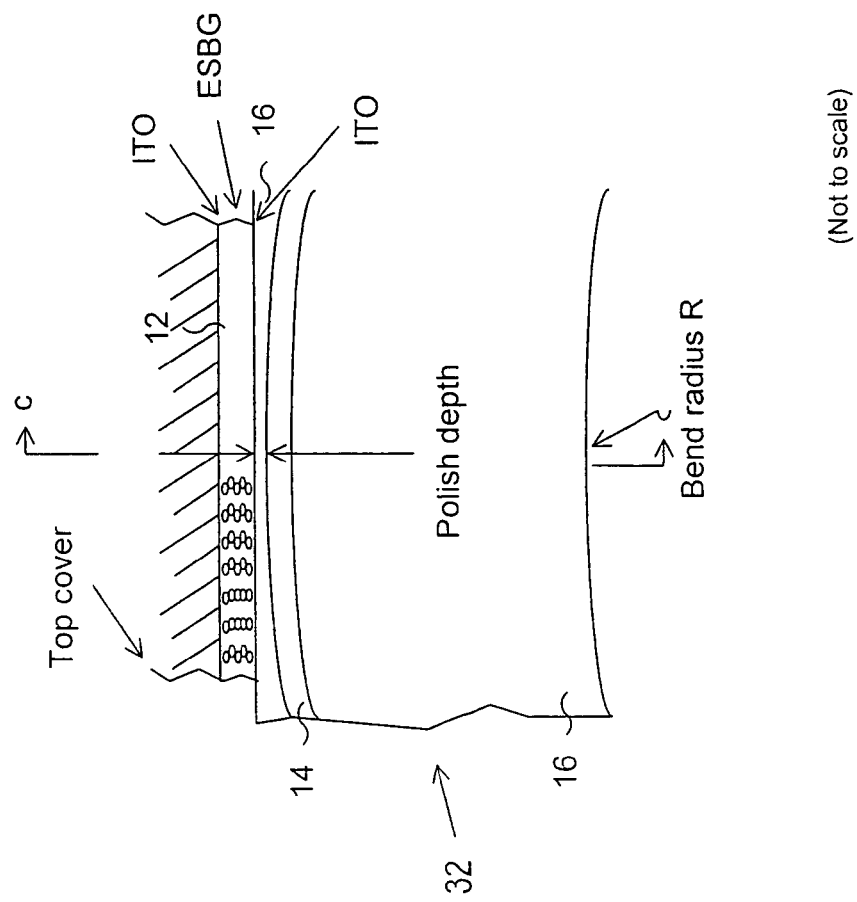
Figure 14C:
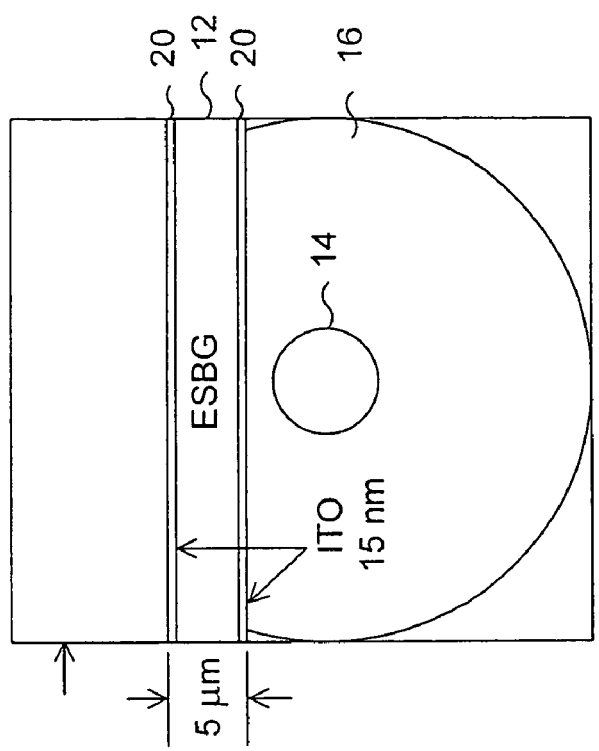
FIGS. 14c and 14d are sectional views along the line c—c in FIG. 14a with the electrode on top and bottom of the ESBG and on the sides of the ESBG respectively.
Figure 14D:
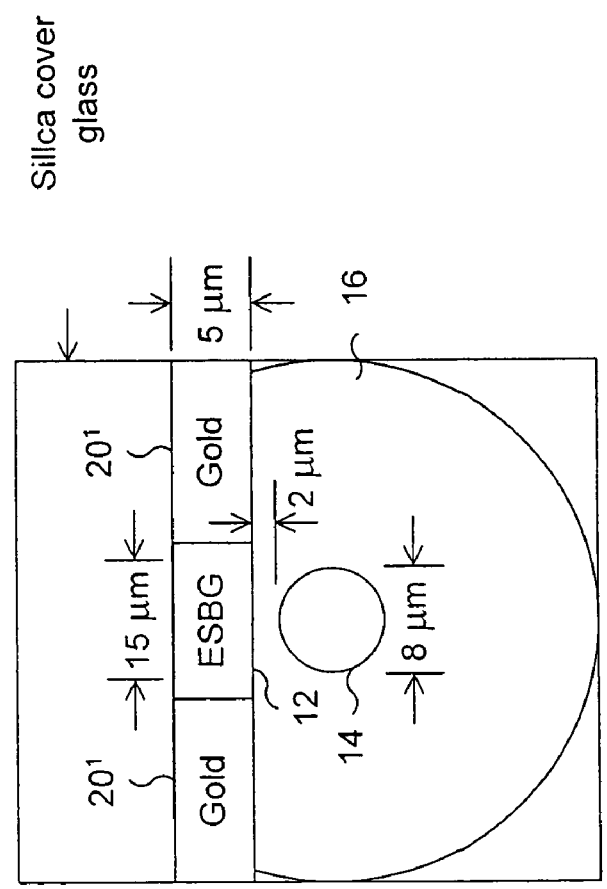

FIG. 14a shows the structure of such a device 32, with FIG. 14b being a chart of the indices and the dimensions of the various components and layers for an illustrative such device, although substantially different index profiles are also intended to be encompassed within the invention. Known calculation approaches based on coupled mode theory can be used to design such devices. FIG. 14c is a sectional view along the line c—c in FIG. 14a, with the electrodes 20 on top and bottom of ESBG 12 to provide a vertical electric field. FIG. 14d is the same view as FIG. 14c for an alternative embodiment where the electrodes are on the sides of the ESBG to provide a transverse electric field. For the FIG. 14d embodiment, the electrodes need not be transparent, gold electrodes being used for a preferred configuration.

Switchable Drop Filter

FIG. 15 shows a single-channel (single-wavelength) filter switch 34 utilizing the coupler-half/ESBG technology. The two states of such a switch are, in terms of end functionality, either to filter (remove) or not to filter one predetermined wavelength channel from a single mode optical fiber 36 transporting a multiplicity of such wavelength channels (for example 16 separate and independent optical signals separated in center wavelength 0.8 nm, corresponding to 100 GHz) However, the planar waveguide SADF described earlier, the drop port for this coupler half device is not available for easy capture by coupling to an optical fiber, so the device function is simply to remove one channel from the bus. In its unpowered state, this device performs a function of selectively filtering out one wavelength channel at a wavelength $\lambda=2n_{eff}\Lambda$ (applying a large loss to that specific channel) while passing all others with minimum or zero loss. In its powered state, the switch passes all wavelength channels, ideally equally and without loss. Such a switch is useful in certain WDM applications, often in combination with other such components. For example, a set of 16 independent parallel switches could be constructed to deal with each of the 16 wavelength channels separately and independently.

To fabricate the device 34 of FIG. 15, a polished coupler is prepared using a long radius bend fiber 36 so as to provide approximately 3–4 mm of interaction region in the form of exposed section of the fiber proximate to the core. After the side of the fiber is polished away, the modal field extends above the surface. A transparent electrode 20 (see FIG. 14a) is then deposited on the polished surface in for example the form of indium tin oxide, thickness 100–200 nm, by methods such as magnetron sputtering. Using spacers known to the liquid crystal display industry, such as glass microspheres, a liquid film of H-PDLC is applied to the surface, after which a cover glass (fused silica) also coated with a transparent electrode, for example indium tin oxide, is applied. Alternatively, polymer conducting electrodes may be used whose index is more closely matched to the silica and ESBG materials, with the advantage of lower loss and simpler design computations. The thickness of the ESBG film may be varied from less than 1 µm to more than 10 µm depending on design and indices of available materials. The principles of waveguiding in planar films are well understood. Considered as a single mode waveguide, the ESBG film is characterized by a V parameter given by $$V = 2\pi \frac{h}{\lambda}(n_{ESBG}^2 - n_{substrate}^2)^{1/2} \qquad \text{Eq. (8)}$$

where h=thickness of ESBG film, λ=free space wavelength, $n_{ESBG}$=average index of ESBG film and $n_{substrate}$=index of fiber cladding. As is well known, the condition for single mode propagation is that V<3.14. Device functioning is sensitive to the index of the ESBG film.

Very thin films are necessary for a low loss device if the polymer film average index is relatively high, for example 1.52, compared to the silica cladding, 1.46, in order to prevent the polymer film from drawing excessive optical power from the fiber. But if the polymer composite possesses an index more closely matched to the silica cladding, as described earlier, a thicker film may be utilized, resulting in a stronger coupling. For example, an ESBG film 8 µm thick may be utilized if the average index can be precisely formulated and controlled so that in it's powered state it precisely matches fused silica≈1.46 and in it's unpowered state it is higher by approximately 0.5%.

Figure 16:
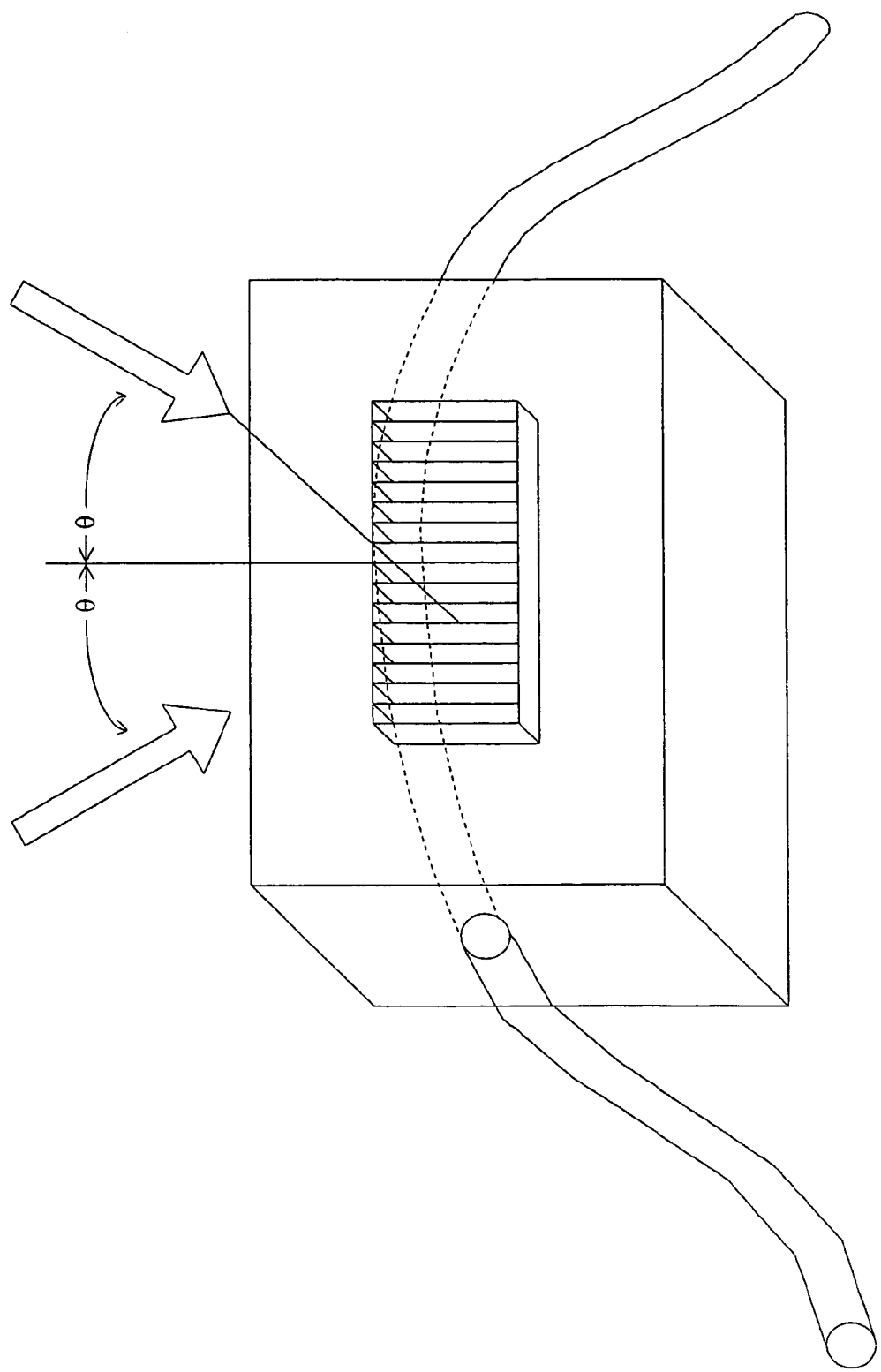
FIG. 16 is a schematic representation of a method for fabricating a device of the type shown in FIG. 15.

A grating is recorded in the liquid by holographic polymerization using interfering beams from an external 488 nm Argon ion laser or other suitable laser, depending upon the photosensitizer absorption spectrum included in the solution, such laser beams to be applied as illustrated in FIG. 16. The effect of the grating is substantially to couple the forward propagating light from the fiber mode to the backward propagating direction in the ESBG film.

The required grating period Λ is determined by the formula $\lambda=(n_{eff}+n_{fiber})\Lambda$, where λ is the desired center wavelength to be filtered and $n_{eff}$ the mode index of the polymer composite film and $n_{fiber}$ the modal index of the optical fiber. If for example it is desired to filter λ=1448 nm and $n_{eff}$=1.47 and $n_{fiber}$=1.45, then the grating must be fabricated so that the period Λ is precisely 493 nm. A grating of this period can be produced by exposing the liquid H-PDLC thin film (captured between the polished coupler surface and the glass cover plate) to 488 nm laser beams with a half angle such that sin θ=λ'/1Λ, where λ' is now the wavelength of the argon laser, 488 nm. In this example, θ will be about 30 degrees. If the spatial index modulation Δn/n<0.001 and L=3000 µm, then dλ/λ<2.5×10$^{-4}$, which is smaller than the channel spacing, as desired.

In its unpowered state, the filter device 34 will selectively remove the signal at 1448.0 nm (in this example) by dispersing it in the polymer film, while approximately uniformly transmitting all other wavelengths, as for example 1447.2 nm and 1448.8 nm, and others. Applying an electric field to the device between electrodes 20 will switch the ESBG film 12, meaning that the periodic index modulation will be caused to disappear by reorienting the liquid crystal directors inside the aspheric microdroplets, matching the liquid crystal index to that of the polymer host, and thereby negating the grating effect. This in turn suppresses the filtering and allows the channel in question to now propagate along with the other channel signals. This switching of a single wavelength within the multiplicity of wavelengths is sometimes referred to as a single-channel drop switch.

Performance measures for such a switch include the dynamic range (on/off ratio) for the affected channel, the shape and width of the spectral response characteristic, the insertion loss for all other channels in the powered and unpowered states, temperature sensitivity of these properties, voltage of operation, speed of operation, power consumption, and polarization sensitivity. Depending on the thickness of the ESBG film, its index and the thicknesses and indices of the transparent electrodes, such a device may be highly polarization sensitive in its filtering properties, losses, dynamic range and other operating characteristics, but such polarization sensitivity can be minimized or eliminated by sing H-PDLC formulations which closely index match the optical fiber core-cladding range.

Switchable Outcoupler

FIG. 17 shows a device 38 fabricated similarly to the Bragg filter but designed as a switchable grating coupler. A grating coupler, is a device known to fiber optics since the early 1970's, uses a grating to couple light propagating from free space into a single mode optical fiber 36, or equivalently in the other direction from the fiber into free space. Such a device is useful, for example, to direct a sampled part of a guided wave to an external detector or array of detectors, or for otherwise coupling optical power from a fiber into a free space distribution in order to interconnect with computer processors, or in complex switching systems. While design of an overlay grating for this purpose is known to the art of fiber optics and waveguide technology, such devices have not previously been switchable. The operational difference from the drop switched filter 34 of FIG. 15 is simply that the period of the grating is somewhat longer, designed to satisfy the condition (in the simplest case, first order diffracted mode)

$$n_{eff} - \sin\theta = \frac{\lambda}{\Lambda} \qquad \text{Eq. (9)}$$

where θ is the angle of the radiated beam from the normal to the planar surface. As an example, for λ=1550 nm and $n_{eff}$=1.47, a grating period Λ=1200 nm will outcouple (or incouple) light from the guided mode to (or from) free space at an angle θ=10.2° from the normal. It is apparent that this outcoupling angle will be wavelength dependent, and in this example will vary from 10.2° to 5.45° over the wavelength range 1550–1650 nm. This variation can be applied to outcouple various wavelength channels to different positions or detectors in free space constituting a type of spectrometer. Thus a multiwavelength WDM signal propagating in the fiber will be outcoupled into free space as a fan-shaped array of signals, with each channel propagating in a slightly different direction. Switching such a device could be used as a WDM signal sampling spectrometer, to divide the signals in space to monitor the equality of optical power in the various channels, or in general as a diagnostic tool for monitoring the performance and status of multiwavelength networks.

By means of applying an electric field through electrodes 20 (not shown, but same as for FIG. 15) to suppress the grating spatial index modulation, the coupling between radiated and guided modes can be disabled. In the powered state of the switch, light propagating in the fiber will then substantially continue through the device and exit the fiber at its far end, ideally without loss. In this device, the switching effect is therefore to couple or decouple guided and free space modes. The utility of such a device is (a) to extract light from optical fibers in a switchable and channel sensitive manner; (b) to interconnect fibers to free space detectors or lasers for testing or measuring the strength of various wavelength channels or other purposes; or (c) to interconnect light from fiber to fiber or waveguide plane to waveguide plane in a complex switching network. Other uses would also be apparent to those skilled in the art. With suitable grating period, the integrated structure of FIGS. 4a, 4b could also couple to space, but is more generally used to couple between waveguides as previously discussed.

Attenuator

A further device consisting of an ESBG film on a coupler-half is a fiber optic attenuator 40, FIG. 18. An attenuator differs from a switch, which is optimized for two distinct states, on and off, powered and unpowered. In contrast, the purpose of an attenuator is to provide a long scale of voltage controlled loss over a range of at least 30 dB (1000:1) for precise control of the optical intensity propagating through the fiber. Such functions are desired for example to equalize the strengths of signals from different sources in a fiber optic network.

This can be constructed similarly to the ESBG film devices previously described, except that a different fabrication scheme for the ESBG film is provided. By producing a grating with very small period Λ, substantially less than the approximately 0.5 µm useful for Bragg reflection filtering at 1550 nm, an ESBG film will produce a loss to the optical signal but will not be highly wavelength selective. In the example of use at 1550 nm and photosensitization of the H-PDLC for 488 nm, a very short period grating of this type can be produced simply by increasing the half angle between the argon laser or other exposing laser beams to be substantially larger than for the prior devices, for example larger than 30°. Such a method produces a "subwavelength" grating, i.e., one whose period is so short that instead of coupling forward to backward modes, or guided to radiated modes, or guided to guided modes, it simply acts as a quasi-homogeneous composite optical medium whose role is now to provide electro-optic index control over an unusually wide index range. In this case, the ESBG grating serves primarily to form very small droplets, since the grating period as such is largely irrelevant. The half angle θ used for exposure will depend on the desired grating period Λ and can be determined from the period in ways known in the art (i.e. sin θ=λ/1Λ where λ is the center wavelength of the band to be attenuated and Λ is the grating period). Such subwavelength gratings may also be formed using a master grating or binary phase mask technique previously described. By virtue of the distribution of extremely small microdroplets whose dimensions (on the order of 30–100 nm) and whose interplane spacing (100–400 nm) are so small, the ESBG film is low in scattering. The optical active property is then simply that the average refractive index can be adjusted by an applied field.

In addition, by virtue of providing a very short period, the polymerization strains that result in "football" shaped microdroplets 26 are reduced, resulting in more nearly spherical droplets. Since the sudden switching of the liquid crystal directors in the microdroplets is strongly dependent on the aspheric shape of the droplets, more nearly spherical droplets will possess a reduced critical electric field, as may be inferred from the published studies of Sutherland et al. This means that instead of switching from one orientation to another at a well defined critical voltage, the liquid crystals will rotate gradually as the electric field is increased. This yields the long scale voltage control of average refractive index required for operation as a fiber optic attenuator.

A further requirement for good performance as an attenuator is that the average refractive index of the ESBG film should (through chemical formulation and subsequent holographic polymerization), be designed to match the fiber optic cladding index (typically, pure silica at 1.46) exactly in its powered state, as can be accomplished by appropriate choice of liquid crystal and polymer host species. This means that in the unpowered state, the average index of such a film might, for example be approximately 1.47, and the proximity of such a film in the evanescent region of the polished optical fiber will result in a substantial, wavelength independent loss. In the fully powered state, the index is altered to match the silica cladding at 1.46, in which case it effectively vanishes into the cladding from the standpoint of the propagating mode, resulting in zero or very small optical loss (attenuation). Between the unpowered and fully powered state will be a long adjustment range of attenuation as a function of applied electric field.

If the ESBG is index matched to the glass fiber as described, the resulting attenuation will also be substantially polarization independent. FIG. 19a shows the optical power transmitted through the fiber as a function of electro-optically altered ESBG index, for the two polarizations TE and TM. Note the substantial equality. FIG. 19b shows the power transmitted as a function of wavelength, for three levels of attenuation, indicating substantial independence of wavelength.

Such a device constitutes a fiber optic attenuator whose performance is independent of wavelength and polarization. Its advantage over similar structures containing pure liquid crystal in an overlay film is that the H-PDLC material has much lower optical scattering and also does not require a separate orientation step, since orientation within microdroplets is spontaneous. The insertion loss of such a device will be very small.

Since the mechanism by which film or ESBG effects attenuation is to selectively outcouple increasing percentages of the signal on fiber 36 through film, such a film may also function as a wavelength independent outcoupler. Further, rather than having a homogeneous film, channels or stripes may be formed in film in the direction parallel to fiber 36 which exhibit an index match with the cladding which may be effective for reducing insertion loss.

Channel Add/drop Cross-connects by use of Grating Frustrated or Grating Assisted Couplers An additional class of devices can be constructed by placing a second coupler half on top of the first, with an ESBG film sandwiched in the middle. Such devices incorporate two optical fibers 36, 36', with four optical ports 42A–42D. FIG. 20 shows one variant of such a device. In this case, the ESBG film is exposed and polymerized by means of a cover glass. Then the cover glass is removed and replaced with an upper coupler-half 32' whose surface has also been provided with an ITO or other transparent electrode 20. Alternatively, a liftoff (decal) deposition approach may be used whereby the ESBG film is prepared and polymerized in a laboratory fixture and then chemically released from its substrate through floating in water or other methods, diced to size, and bonded to the lower coupler-half 32.

In the device shown in FIG. 20, a multiplicity of wavelength channels propagates in one single mode fiber into the device. The device is designed, so that the fibers in the two coupler halves are non-identical (see FIG. 16 of the '950 application), as may be achieved for example by use of single mode fibers with slightly different diameters or core indices, such that the propagation constants for the various wavelength channels in the first fiber ($\beta i$) differ from those ($\beta' i$) in the second fiber. In this case, in the absence of a grating film between them, in spite of their proximity, the coupling will be low or nonexistent because $\beta_i \neq \beta'_i$.

However if an ESBG grating is now provided between the two nonidentical coupler halves and if for some one channel i the grating period condition $\Lambda$ satisfies the condition $$\frac{2\pi}{\Lambda} = \beta_i - \beta'_i \qquad \text{Eq. (10)}$$

then the coupling will be grating-assisted and the i channel will be coupled over to the second fiber, while all the other channels will not be, and will continue to propagate in their original fiber. Upon switching the ESBG off (i.e. applying power to ESBG), this effect will be disabled, and all the signals will propagate unaffected and uncoupled.

Thus, the grating assisted coupler using an ESBG between nonidentical coupler halves has been described. Only one channel is coupled from the first into the second fiber, the others propagating unchanged, and in the powered state all channels propagate unchanged.

2×2 Space Switch

The devices described so far are wavelength selective. FIG. 21 shows a variant structure designed to minimize wavelength dependence and to selectively couple light from a fiber 36 in coupler-half 32 into a second identical fiber 36' in coupler-halve 32'. As shown in FIG. 21, this device differs from earlier embodiments in that the two halves are bonded at an angle $2\theta$ to one another, with an ESBG film 12 sandwiched in between. If the grating period $\Lambda$ satisfies the condition $$\sin\theta = \frac{\lambda}{(2n_{eff}\Lambda)} \qquad \text{Eq. (11)}$$

then light will be coupled from the input port 42A of fiber 36 into the output port 42D of fiber 36' and from the input port 42B of fiber 36' to the output port 42C of fiber 36 using the unpowered state of the grating, i.e. the light will be exchanged from fiber to fiber. In its powered state, the periodic index variation constituting the grating is turned off and the coupling is disabled, keeping all signals in their original fibers. For example, if $\lambda$=1550 nm and $\theta$=45°, $\Lambda$=746 nm.

For this application, it is desirable to use a short interaction length and a large liquid crystal loading in formulating the H-PDLC so as to obtain large index modulation. In essence, this is an embodiment of the 2×2 space switches described in the '950 application, except that the fiber optic coupler and overlay film methods are used in this embodiment.

FIGS. 22a and 22b describe still another form of a grating assisted coupler. Two fibers 36, 36' are mounted on curved paths in single silica block. On the polished surface, an ESBG grating 12 connects the two evanescent regions with a polymer guiding film. This device is analogous to the "s" bend planar device described earlier, except that the ESBG is now in a planar region, not a confined channel waveguide. The grating is capable of coupling the fiber mode to slab modes that propagate off axis, leading to broadening of the drop bandwidth, and a spreading of the field before being out-coupled by the second fiber. This results in reduced efficiency and a somewhat degraded spectral response, as illustrated in FIG. 22c. Such a response would however be substantially improved if the ESBG film, rather than being a two-dimensional planar layer, is etched to reduce it to a narrow channel parallel to the fiber cores.

While the invention has been described above with respect to a variety of embodiments and various processes have been described both for fabricating individual devices and structures containing multiple such devices, these various devices, structures and methods have been provided by way of example only and it will be apparent to those skilled in the art that numerous variations, including ones discussed above on these devices, structures and methods are possible while still practicing the teachings of the invention, which is to be limited only by the following claims.

What is claimed is:

1. A method of fabricating an integrated optical network having a plurality of nodes, with at least one ESBG formed at each of said nodes including:
   forming selected optical waveguides in a substrate, at least selected ones of said waveguides passing through selected ones of said nodes;
   forming an ESBG with electrodes at each node; and
   covering the waveguides and ESBGs
   wherein said forming an ESBG step includes forming an electrode film and a H-PDLC film at each node, and exposing the H-PDLC film at each node to form an ESBG grating thereon.

2. A method as claimed in claim 1 wherein said covering step includes forming a second electrode film on a cover plate at each node; and covering the waveguides/H-PDLC films with said cover plate, each electrode on the coverplate overlying the H-PDLC film for the corresponding node.

3. A method as claimed in claim 1 wherein said exposing step includes one of (a) exposing each H-F DLC film with two interfering light beams of suitable wavelength, the beams being as a selected angle to each other; (b) exposing all of the films simultaneously through a suitable binary phase mask; and (c) exposing each of the films through a suitable mask.

4. A method as claimed in claim 1 wherein said forming waveguides step includes forming selected optical waveguides in a first substrate and in a second substrate, which substrates are mounted adjacent each other during said covering step 3, the waveguides on the two substrates intersecting at at least selected nodes.

5. A method as claimed in claim 4 wherein a H-PDLC film with ESBG gratings formed therein at said nodes is one of (a) formed on one of said substrates, and (b) independently formed and mounted between said substrates.

6. A method as claimed in claim 4 said forming electrode film step includes forming an electrode on each substrate on a waveguide at each node.

7. An integrated optical network having N guided wave optical inputs, and M guidewave optical outputs, said network including:
   an optical waveguide connected to each input and to each output, said weveguides intersecting at nodes; and
   an ESBG switch component at each node which is operative to either pass an optical signal on one waveguide intersecting at the node on the one waveguide or to transfer at least a portion of such optical signal to the other waveguide intersecting the node, depending on the state of the ESBG;
   wherein all of said waveguides have substantially the same index n, and wherein the ESBG switch component at each node includes an ESBG having a grating with an index contrast n in optical contact with each waveguide, and at least one waveguide interconnecting the ESBGs, said waveguide having an index $n_2$, where $n_{1-n2} \geq \Delta n$.

* * * * *